United States Patent
Sprosta et al.

(10) Patent No.: US 12,096,848 B2
(45) Date of Patent: Sep. 24, 2024

(54) ORAL CARE IMPLEMENT, HANDLE THEREOF, AND ORAL CARE REFILL HEAD THEREFOR

(71) Applicant: Colgate-Palmolive Company, New York, NY (US)

(72) Inventors: Al Aquanza Sprosta, Maplewood, NJ (US); Eduardo Jimenez, Manalapan, NJ (US); Douglas Hohlbein, Hopewell, NJ (US); Michael Rooney, Millburn, NJ (US); Yanmei Ji, Suzhou (CN); Xiangji Ding, YangZhou (CN)

(73) Assignee: Colgate-Palmolive Company, New York, NY (US)

( * ) Notice: Subject to any disclaimer, the term of this patent is extended or adjusted under 35 U.S.C. 154(b) by 162 days.

(21) Appl. No.: 15/733,783

(22) PCT Filed: Nov. 25, 2019

(86) PCT No.: PCT/CN2019/120512
§ 371 (c)(1),
(2) Date: Oct. 26, 2020

(87) PCT Pub. No.: WO2021/102612
PCT Pub. Date: Jun. 3, 2021

(65) Prior Publication Data
US 2021/0368973 A1 Dec. 2, 2021

(51) Int. Cl.
*A46B 7/04* (2006.01)
*A46B 9/04* (2006.01)
(52) U.S. Cl.
CPC ............... *A46B 7/042* (2013.01); *A46B 9/04* (2013.01); *A46B 2200/1066* (2013.01)
(58) Field of Classification Search
CPC ..... A46B 7/04; A46B 7/42; A46B 2200/1066; A61C 17/222

(Continued)

(56) References Cited

U.S. PATENT DOCUMENTS

| 3,369,265 A | 2/1968 | Halberstadt et al. |
| 4,811,445 A * | 3/1989 | Lagieski ............. A46B 5/0095 |
| | | 401/268 |

(Continued)

FOREIGN PATENT DOCUMENTS

| CH | 391652 | 5/1965 |
| CN | 103648434 | 3/2014 |

(Continued)

OTHER PUBLICATIONS

International Search Report and Written Opinion of the International Searching Authority in International Application No. PCT/CN2019/120512, mailed Aug. 28, 2020.

(Continued)

*Primary Examiner* — Brian D Keller
*Assistant Examiner* — Jason Khalil Hawkins

(57) ABSTRACT

An oral care implement that includes a handle and an oral care refill head. The oral care refill head is alterable between a first state in which it is separated from the handle and a second state in which it is coupled to the handle. The oral care refill head has a proximal edge surface that defines an opening into a sleeve cavity. The proximal edge surface is inclined with radial distance from a cavity axis of the sleeve cavity. Similarly, the handle has a gripping portion that terminates at a distal end and a stem that protrudes from the distal end. The annular shoulder that is inclined downwardly and away from a stem to facilitate mating of the oral care refill head to the handle. The oral care refill head may have features for securing the oral care refill head to the stem of the handle.

20 Claims, 18 Drawing Sheets

(58) Field of Classification Search
USPC .......................................................... 15/145
See application file for complete search history.

(56) References Cited

U.S. PATENT DOCUMENTS

| | | | |
|---|---|---|---|
| 4,827,550 | A | 5/1989 | Graham et al. |
| 5,365,627 | A | 11/1994 | Jousson et al. |
| 6,161,244 | A | 12/2000 | Jeannet et al. |
| 6,785,926 | B2 | 9/2004 | Green |
| D517,213 | S | 3/2006 | Vu et al. |
| D517,325 | S | 3/2006 | Black et al. |
| D617,564 | S | 6/2010 | Nanda |
| 8,196,246 | B1 | 6/2012 | Haynes |
| D724,845 | S | 3/2015 | Yoshida et al. |
| 9,168,117 | B2 | 10/2015 | Yoshida et al. |
| D749,851 | S | 2/2016 | Watkins |
| D762,986 | S | 8/2016 | Simon |
| D769,626 | S | 10/2016 | Bloch et al. |
| D788,469 | S | 6/2017 | McGarry et al. |
| 9,775,693 | B2 | 10/2017 | Fattori |
| D844,995 | S | 4/2019 | Wong et al. |
| D853,732 | S | 7/2019 | Wainless et al. |
| D855,998 | S | 8/2019 | Hielscher et al. |
| D869,855 | S | 12/2019 | Khayat |
| 10,603,147 | B2 | 3/2020 | Bloch et al. |
| 10,603,150 | B2 | 3/2020 | Bloch et al. |
| D886,459 | S | 6/2020 | Yuan |
| D886,460 | S | 6/2020 | Xi et al. |
| D888,435 | S | 6/2020 | Damavandi et al. |
| 10,667,892 | B2 * | 6/2020 | Bärtschi ............ A61C 17/3481 |
| D890,296 | S | 7/2020 | Chandler |
| 10,709,533 | B2 | 7/2020 | Bloch et al. |
| D899,094 | S | 10/2020 | Wainless et al. |
| 10,792,136 | B2 | 10/2020 | May et al. |
| D901,777 | S | 11/2020 | Gentile |
| 10,864,065 | B2 | 12/2020 | Fritsch et al. |
| D907,924 | S | 1/2021 | Wong et al. |
| 10,898,304 | B2 | 1/2021 | Yoshida et al. |
| D912,988 | S | 3/2021 | Langhammer |
| D922,775 | S | 6/2021 | Albay et al. |
| D929,131 | S | 8/2021 | Sprosta et al. |
| D950,956 | S | 5/2022 | Gatzemeyer et al. |
| D961,267 | S | 8/2022 | Ji et al. |
| 2014/0143963 | A1* | 5/2014 | Fattori ............ A61C 17/222 15/22.1 |
| 2014/0150190 | A1* | 6/2014 | Fattori ............ A61C 17/225 15/22.1 |
| 2015/0113747 | A1 | 4/2015 | May et al. |
| 2018/0368960 | A1 | 12/2018 | Fritsch et al. |
| 2019/0117356 | A1* | 4/2019 | Bärtschi ............ A47K 7/04 |
| 2019/0175320 | A1* | 6/2019 | Bloch ............ A46B 9/04 |
| 2019/0200743 | A1* | 7/2019 | Jungnickel ............ A46B 5/021 |
| 2019/0231063 | A1 | 8/2019 | May et al. |

FOREIGN PATENT DOCUMENTS

| | | |
|---|---|---|
| CN | 103889365 | 6/2014 |
| CN | 104135964 | 11/2014 |
| CN | 104837439 | 8/2015 |
| CN | 105188471 | 12/2015 |
| CN | 304364633 | 11/2017 |
| CN | 108113189 | 6/2018 |
| CN | 108471869 | 8/2018 |
| CN | 304861872 | 10/2018 |
| CN | 109907851 | 6/2019 |
| CN | 110025390 | 7/2019 |
| CN | 305299010 | 8/2019 |
| CN | 305410234 | 10/2019 |
| CN | 305429205 | 11/2019 |
| DE | 202010013214 U1 | 3/2011 |
| FR | 2325335 | 6/1982 |
| FR | 2476994 | 2/1984 |
| GB | 914844 | 1/1963 |
| JP | H60112926 | 7/1985 |
| JP | S60112926 U | 7/1985 |
| JP | H06-042661 | 11/1994 |
| JP | H08299372 | 11/1996 |
| JP | 09-019445 | 1/1997 |
| JP | H919445 A | 1/1997 |
| JP | 10-023928 | 1/1998 |
| JP | 2005296515 | 10/2005 |
| JP | 2011139844 | 7/2011 |
| JP | 2011143057 | 7/2011 |
| WO | 2014/093059 | 6/2014 |
| WO | 2018/098211 | 5/2018 |
| WO | 2021/102612 | 6/2021 |
| WO | 2022/133696 | 6/2022 |

OTHER PUBLICATIONS

Colgate Keep Toothbrush, announced 2021 [online], [site visited Mar. 5, 2021]. Available from internet, URL: https://www.amazon.com/Colgate-Manual-Toothbrush-Clean-Starter/dp/B08QR6D6SQ/ref=sr_1_1 (Year:2021).

International Search Report and the Written Opinion of the International Searching Authority issued in International Application PCT/CN2020/138181 mailed Sep. 24, 2021.

Taiwan Patent Office (TIPO) Search Report dated Nov. 29, 2020 issued in TW Patent Appln. No. 109302517; pp. 1-2, including English translation.

Taiwan Patent Office (TIPO) Search Report dated Nov. 29, 2020 issued in TW Patent Appln. No. 109302518; pp. 1-2, including English translation.

* cited by examiner

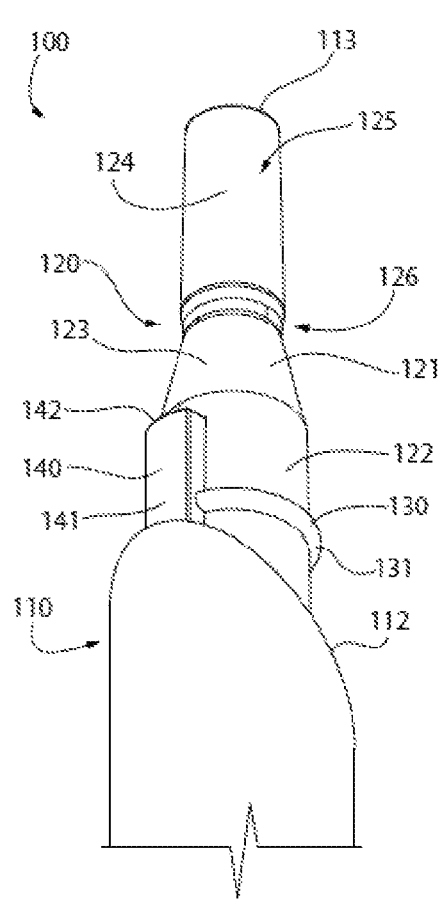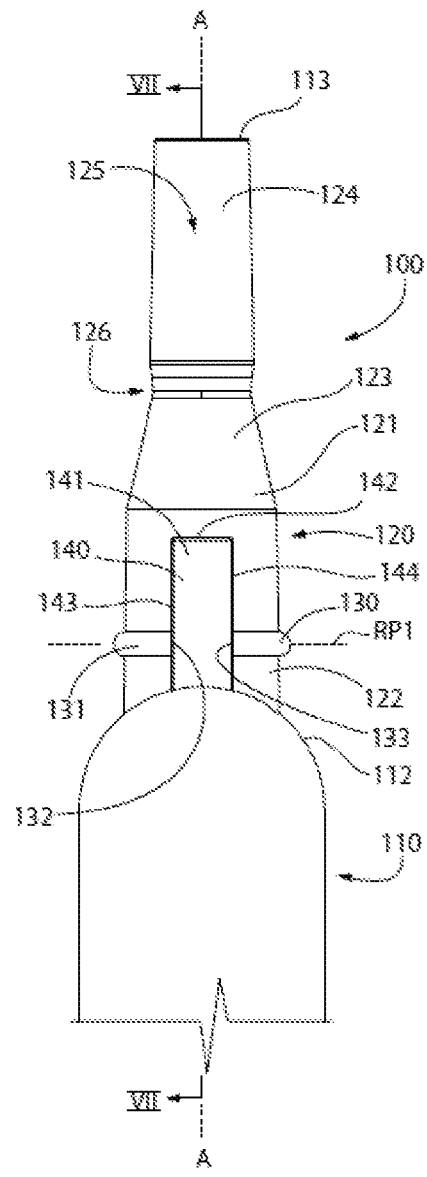
FIG. 3
FIG. 4

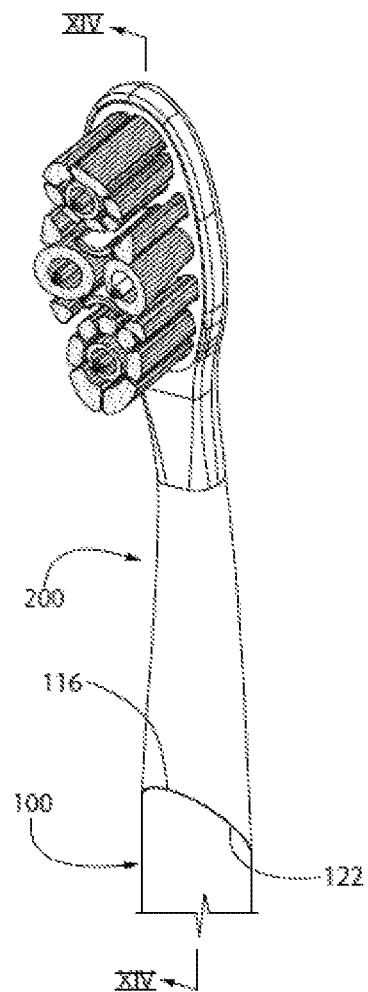
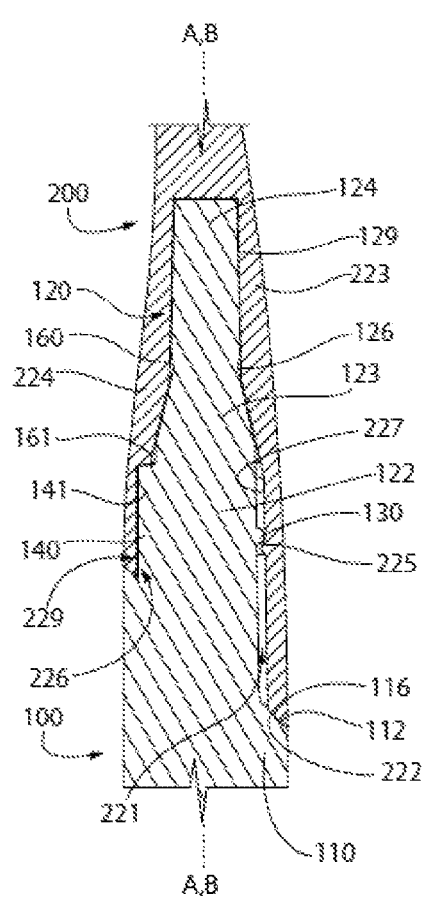
FIG. 14A
FIG. 14B

ORAL CARE IMPLEMENT, HANDLE THEREOF, AND ORAL CARE REFILL HEAD THEREFOR

BACKGROUND

Toothbrushes having replaceable heads have been used for many years, enabling users to replace the head of the toothbrush for continued use with the same handle. This is often used for electric toothbrushes because the expensive electronic circuitry is stored in the handle making it cost-prohibitive to have to dispose of the handle each time that the cleaning elements on the head have worn out and require replacement. However, there are also manual toothbrushes in existence that utilize a replaceable head, which can be beneficial to the environment, for example, because less plastic waste is being added to the landfills when only the head is being replaced every three months or so. There is a continuing need for an improvement in the connection mechanism between the handle and the replaceable heads configured to be attached thereto.

BRIEF SUMMARY

The present invention is directed to an oral care implement that includes a handle and an oral care refill head. The oral care refill head is alterable between a first state in which it is separated from the handle and a second state in which it is coupled to the handle. The oral care refill head has a proximal edge surface that defines an opening into a sleeve cavity. The proximal edge surface is inclined downwardly and away with radial distance from a cavity axis of the sleeve cavity. Similarly, the handle has a gripping portion that terminates at a distal end and a stem that protrudes from the distal end. The annular shoulder that is inclined downwardly and away from a stem to facilitate mating of the oral care refill head to the handle. The oral care refill head may have features for securing the oral care refill head to the stem of the handle.

In one aspect, the invention may be an oral care implement comprising: a handle comprising: a gripping portion having a distal end; and a stem extending along a stem axis and protruding from the distal end of the gripping portion so that the distal end of the gripping portion comprises an annular shoulder surface that circumscribes the stem, the stem comprising a stem interference section and a stem snap element; the annular shoulder surface extending radially from an outer shoulder edge to an inner shoulder edge adjacent the stem, the annular shoulder surface inclined from the inner shoulder edge to the outer shoulder edge in one direction either upwardly towards the distal end of the stem or downwardly away from the distal end of the stem with increasing distance from the stem axis, and a sleeve portion comprising a sleeve cavity extending along a cavity axis, a proximal edge surface defining an opening into the sleeve cavity, a sleeve interference section, and a sleeve snap element; and the proximal edge surface of the sleeve portion extending radially from an outer sleeve edge to an inner sleeve edge, the proximal edge surface inclined from the inner sleeve edge to the outer sleeve edge in one direction either upwardly towards the oral treatment portion or downwardly away from oral treatment portion with increasing distance from the cavity axis; the oral care refill head alterable between: a first state in which the oral care refill head is separated from the handle; and a second state in which the stem of the handle is disposed within the sleeve cavity of the sleeve portion so that the proximal edge surface of the oral care refill head is adjacent the annular shoulder surface of the handle, the oral care refill head secured to the handle by at least: (1) an interference fit between the stem interference section and the sleeve interference section; and (2) a snap-fit interlock between the stem snap element and the sleeve snap element.

In another aspect, the invention may be an oral care refill head for detachable coupling to a stem of a handle, the oral care refill head comprising: an oral care treatment portion; and a sleeve portion comprising: a sleeve cavity extending along a cavity axis; a sleeve interference section configured to form an interference fit with a stem interference section of the stem; a sleeve snap element configured to snap-interlock with a stem snap element of the stem; and a proximal edge surface that defines an opening into the sleeve cavity, the proximal edge surface of the sleeve portion extending radially from an outer sleeve edge to an inner sleeve edge, the proximal edge surface inclined from the inner sleeve edge to the outer sleeve edge in one direction either upwardly towards the oral treatment portion or downwardly away from oral treatment portion with increasing distance from the cavity axis.

In yet another aspect, the invention may be an oral care refill head for detachable coupling to a stem of a handle, the oral care refill head comprising: an oral care treatment portion comprising a front surface facing a first direction, a plurality of tooth cleaning elements protruding from the front surface; and a sleeve portion comprising: a distal end to which the oral care treatment portion is coupled; a front surface facing the first direction and a rear surface facing a second direction, the second direction opposite the first direction; a sleeve cavity extending along a cavity axis and configured to receive the stem of the handle; a proximal edge surface that defines an opening into the sleeve cavity, the proximal edge surface extending from an outer sleeve edge to an inner sleeve edge, wherein a front portion of the outer sleeve edge is located a first axial distance from the distal end of the sleeve portion and a rear portion of the outer sleeve edge of the sleeve portion is located a second axial distance from the distal end of the sleeve portion, the second axial distance greater than the first axial distance; a sleeve snap element configured to snap-interlock with a stem snap element of the stem, the sleeve snap element circumscribed by a wall of the sleeve portion.

In a further aspect, the invention may be a handle for detachably coupling to an oral care refill head, the handle comprising: a gripping portion having a distal end; and a stem extending along a stem axis and protruding from the distal end of the gripping portion, the stem comprising: a stem body having an outer surface; a stem ring protruding from and extending circumferentially around the outer surface of the stem body, the stem ring configured to snap-interlock with a sleeve snap element of a sleeve portion of the oral care refill head; a stem rib that protrudes from and extends axially along an outer surface of a stem body, the stem rib intersecting the stem ring; and the stem rib protruding a first height from the outer surface of the stem body and the stem ring protruding a second height from the outer surface of the stem body, the second height being less than the first height.

In a still further aspect, the invention may be an oral care refill head for detachable coupling to a stem of a handle, the oral care refill head comprising: an oral care treatment portion; and a sleeve portion comprising: a sleeve cavity extending along a cavity axis and configured to receive the stem of the handle; a proximal edge surface that defines an opening into the sleeve cavity, the proximal edge surface of the sleeve portion extending radially from an outer sleeve edge to an inner sleeve edge, the proximal edge surface inclined from the inner sleeve edge to the outer sleeve edge in one direction either upwardly towards the oral treatment portion or downwardly away from oral treatment portion with increasing distance from the cavity axis; and one or more features for securing the oral care refill head to the stem of the handle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a close-up perspective view of area III of FIG. 2;

FIG. 4 is a close-up front view of area III of FIG. 2;

FIG. 14A is a perspective view illustrating the oral care refill head of FIG. 1 and a portion of the handle of FIG. 1 in the attached state;

FIG. 14B is a cross-sectional view taken along line XIV-XIV of FIG. 14A;

DETAILED DESCRIPTION

Figure 1:
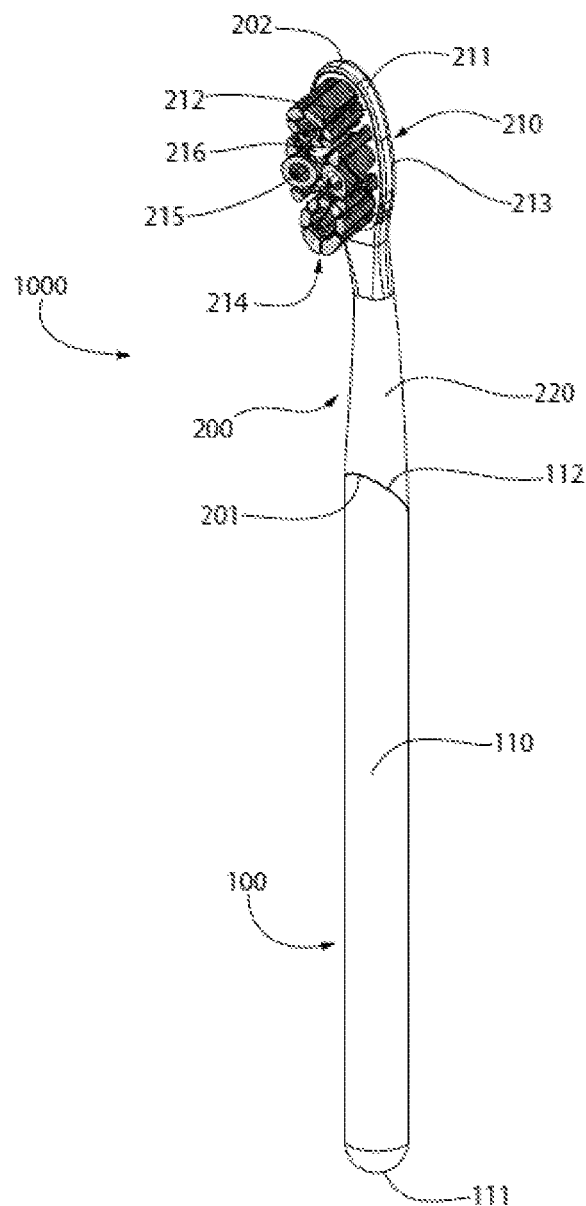
FIG. 1 is a perspective view of an oral care implement in accordance with an embodiment of the present invention, whereby a handle and an oral care refill head are in an attached state.

The following description of the preferred embodiment(s) is merely exemplary in nature and is in no way intended to limit the invention, its application, or uses.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected." "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Figure 2:
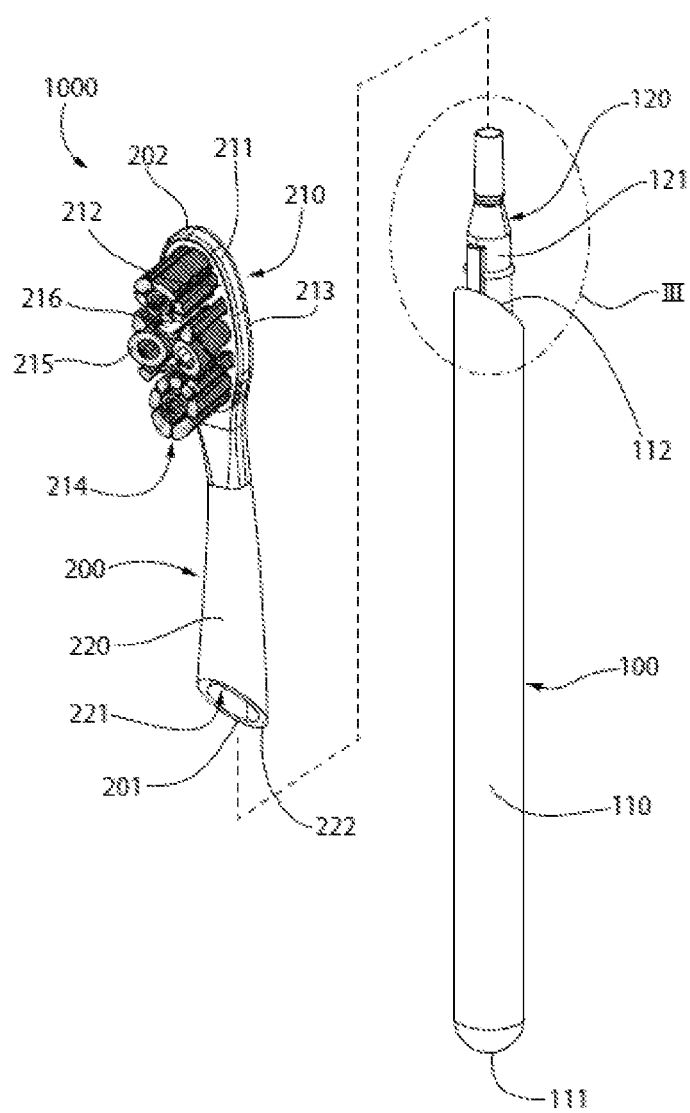
FIG. 2 is a perspective view of the oral care implement of FIG. 1 with the handle and the oral care refill head thereof in a detached state.

Referring first to FIGS. 1 and 2, an oral care implement 1000 is illustrated in accordance with an embodiment of the present invention. In the exemplified embodiment, the oral care implement 1000 is a manual toothbrush. However, the invention is not to be so limited in all embodiments and the oral care implement 1000 can take on other structural forms, including being a powered toothbrush, a tongue scraper, a gum and soft tissue cleanser, a water pick, an interdental device, a tooth polisher, a specially designed ansate implement having tooth engaging elements, or any other type of implement that is commonly used for oral care. Furthermore, in still other embodiments the implement may not be specifically used for oral care, but could instead be a personal care implement which includes the various types of oral care implements noted herein and also includes hairbrushes, razors, body scrubbers, skin treatment devices, or the like. Thus, it is to be understood that the inventive concepts discussed herein can be applied to any type of oral care implement or personal care implement unless a specific type of implement is specified in the claims.

The oral care implement 1000 generally comprises a handle 100 and an oral care refill head 200. The handle 100 is the portion of the oral care implement 1000 that is gripped by a user during use of the oral care implement 1000 and the oral care refill head 200 is the portion of the oral care implement 1000 that includes a treatment portion for performing a treatment to the user, such as a cleaning of the oral cavity. The oral care refill head 200 is alterable between a first state in which the oral care refill head 200 is separated from the handle (as shown in FIG. 2) and a second state in which the oral care refill head 200 is coupled to the handle 100 (as shown in FIG. 1). Thus, the oral care refill head 200 is replaceable so that once the treatment portion thereof becomes worn, it can be replaced with a new oral care refill head by attaching the new oral care refill head to the same common handle 100. This may reduce costs and waste which consumers find desirable in today's climate.

The handle 100 generally comprises a gripping portion 110 extending from a proximal end 111 to a distal end 112 and a stem 120 extending or protruding from the distal end 112 of the gripping portion 110. The gripping portion 110 of the handle 100 is the portion that is typically gripped and manipulated by a user during user of the oral care implement 1000 to perform a treatment function. In the exemplified embodiment, the gripping portion 110 of the handle 100 has a round or circular/oval cross-sectional shape. However, the invention is not to be limited by this in all embodiments and the gripping portion 110 can take on any desired shape including having additional recesses, contours, or the like to enhance gripability. The stem 120 of the handle 100 is the portion that is used to couple the handle 100 to the oral care refill head 200, as will be described in much greater detail below. Thus, the stem 120 has features that facilitate the attachment of the handle 100 to the oral care refill head 200. The stem 120 comprises a stem body 121 having several different sections that serve different functions in achieving an acceptable coupling between the handle 110 and the oral care refill head 200.

The stem 120 and the gripping portion 110 are integrally formed as a unitary and monolithic component in the exemplified embodiment. Thus, in the exemplified embodiment the entirety of the handle 100 is formed out of a first material. In some embodiments, the first material may have a first hardness. In some embodiments, the first material may be a metal or a metal alloy. In other embodiments the first material may be wood or a hard plastic. In other embodiments, the gripping portion 110 and the stem 120 may be formed from different materials. Thus, for example, the gripping portion 110 may be formed from metal or a metal alloy and the stem 120 may be formed from a hard plastic. In other embodiments, the gripping portion 110 may be formed from a hard plastic and the stem 120 may be formed from metal or a metal alloy. In still other embodiments, the gripping portion 110 may be formed from wood and the stem 120 may be formed from metal, metal alloys, hard plastic, or combinations thereof. Thus, some variation in the material used to form the different parts of the handle 100 may be possible in some embodiments.

The oral care refill head 200 comprises an oral care treatment portion and a sleeve portion 220. The sleeve portion 220 comprises a sleeve cavity 221 that is configured to receive at least a portion of the stem 120 of the handle 100 for purposes of coupling the oral care refill head 200 to the handle 100. The oral care refill head 200 extends from a proximal end 201 that is formed by a proximal edge surface 222 of the sleeve portion 220 to a distal end 202 that is formed by a terminal end of the oral care treatment portion 210. The oral care treatment portion 210 comprises a head body 211 located at a distal end of the sleeve portion 220. The head body 211 may be integrally formed with the sleeve portion 220 as a monolithic component. The head body 211 has a front surface 212 facing a first direction and a rear surface 213 facing a second direction that is opposite the first direction. The oral care treatment portion 210 also comprises a plurality of tooth cleaning elements 214 protruding from the front surface 212 of the head body 211 in the first direction.

In the exemplified embodiment, the plurality of tooth cleaning elements 214 comprises a plurality of bristle tufts 215 and a plurality of elastomeric cleaning elements 216. The bristle tufts 215 and the elastomeric cleaning elements 107 collectively form a cleaning element field on the head body 211. The particular arrangement and/or pattern and/or location of the various bristle tufts 215 and elastomeric cleaning elements 216 is not to be limiting of the present invention in all embodiments. Thus, the bristle tufts 215 and the elastomeric cleaning elements 216 could be positioned at locations other than that which is depicted in the drawings. Furthermore, in some embodiments the oral care refill head 200 may include only bristle tufts 215 and none of the elastomeric cleaning elements 216. Thus, various permutations of the plurality of tooth cleaning elements 214 are possible within the scope of the invention described herein.

Furthermore, where it does not conflict with the other disclosure provided herein or the claims, it should be appreciated that the term "tooth cleaning elements" may be used in a generic sense to refer to any structure that can be used to clean, polish, or wipe the teeth and/or soft oral tissue (e.g. tongue, cheek, gums, etc.) through relative surface contact. Common examples of "tooth cleaning elements" include, without limitation, bristle tufts, filament bristles, fiber bristles, nylon bristles, polybutylene terephthalate (PBT) bristles, spiral bristles, rubber bristles, elastomeric protrusions, flexible polymer protrusions, combinations thereof, and/or structures containing such materials or combinations. Thus, any combination of these tooth cleaning elements may be used within the tooth cleaning element field in some embodiments. Furthermore, where bristles are used for one or more of the tooth cleaning elements 214, such bristles can be tapered, end-rounded, spiral, or the like.

In embodiments that use elastomeric materials to form one or more of the tooth cleaning elements 214, suitable elastomeric materials may include any biocompatible resilient material suitable for uses in an oral hygiene apparatus. To provide optimum comfort as well as cleaning benefits, the elastomeric material of any such tooth cleaning element may have a hardness property in the range of A10 to A70 Shore hardness in one embodiment, or A8 to A25 Shore hardness in another embodiment. One suitable elastomeric material is styrene-ethylene/butylene-styrene block copolymer (SEBS) manufactured by GLS Corporation. Nevertheless, SEBS material from other manufacturers or other materials within and outside the noted hardness range could be used.

The tooth cleaning elements 214 may be coupled to the head body 211 in any manner known in the art, including staples, in-mold tufting (IMT), anchor-free tufting (AFT), or a modified AFT known as AMR. In the exemplified embodiment, the bristle tufts 215 are secured to the head body 211 using staples/anchors and the elastomeric cleaning elements 216 are secured to the head body 211 via an injection molding process.

The oral care refill head 200 may be formed of a second material that is different than the first material that is used to form the handle 100. For example, the second material may be a hard plastic. Thus, in some embodiments the handle 100 or at least the gripping portion 110 of the handle 100 may be formed from a metal or a metal alloy and the oral care refill head 200 may be formed from a hard plastic. Of course, other material combinations may be used in other embodiments as may be desired. In some embodiments, the material used to form the handle 100 and/or the stem 120 thereof may have a first hardness and the material used to form the oral care refill head 200 or the sleeve portion 220 thereof may have a second hardness, with the first hardness of the first material being greater than the second hardness of the second material. Thus, the handle 100 may be formed of a harder material than the oral care refill head 200. In some embodiments, the stem 120 may be formed of a harder material than the sleeve portion 220 of the oral care refill head 200 irrespective of the materials used to form the other parts of the handle 100 and the oral care refill head 200.

Figure 5:
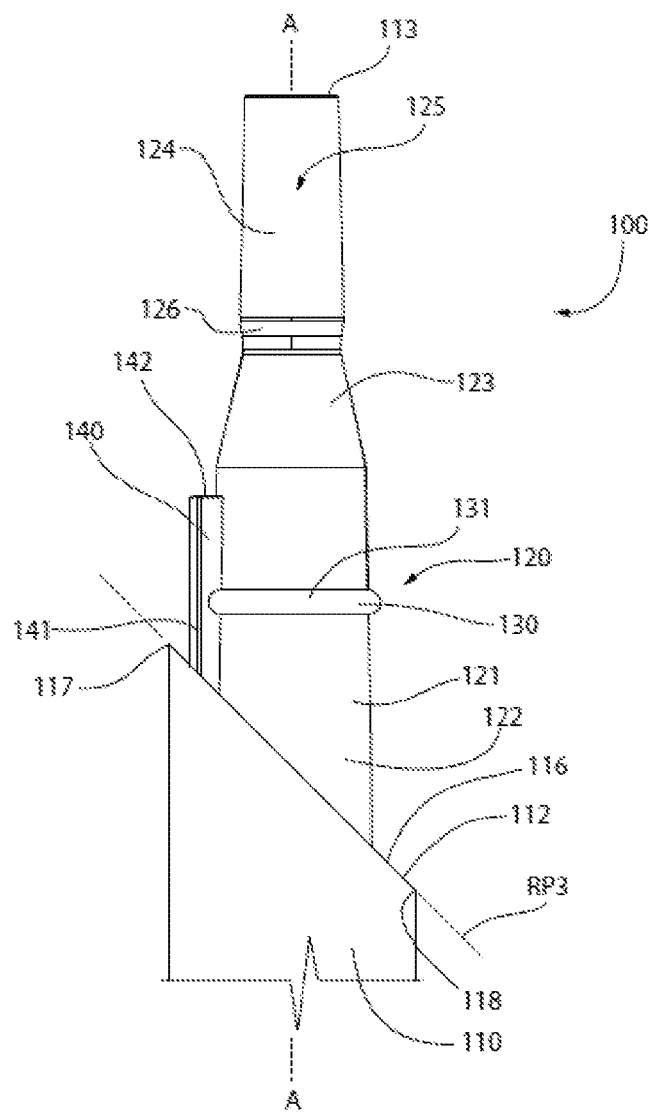
FIG. 5 is a close-up side view of area III of FIG. 2.

Referring to FIGS. 3-5, the stem 120 of the handle 100 will be described in detail in accordance with an exemplary embodiment of the present invention. As noted above, the stem 120 comprises the stem body 121, which protrudes from the distal end 112 of the gripping portion 110 of the handle 100 and terminates at a distal end 113 of the handle 100. The stem 120 (and the stem body 121 thereof) extends along a stem axis A-A from the distal end 112 of the gripping portion 110 of the handle 100 to the distal end 113 of the handle 100. In the exemplified embodiment, the stem body 121 comprises a stem base section 122, a stem guide section 123, and a stem interference section 124. The stem base section 122, the stem guide section 123, and the stem interference section 124 all form a part of the monolithic stem body 121 in the exemplified embodiment.

Thus, the stem base section 122, the stem guide section 123, and the stem interference section 124 each form an axial portion of the stem body 121. Specifically, the stem base section 122 is the section that extends from the distal end 112 of the gripping portion 110, the stem guide section 123 extends from an end of the stem base section 122, and the stem interference section 124 extends from an end of the stem guide section 123. The stem guide section 123 is located between the stem base section 122 and the stem interference section 124. The stem interference section 124 comprises the distal end 113 of the handle 100.

In the exemplified embodiment, the stem 120 comprises a stem snap element 130 and a stem rotational alignment element 140. In the exemplified embodiment the stem snap element 130 and the stem rotational alignment element 140 are located on the stem base section 122 of the stem 120. More specifically, in the exemplified embodiment the stem snap element 130 and the stem rotational element 140 are located entirely on the stem base section 122 such that no portion of the stem snap element 130 or the stem rotational element 140 extends onto the stem guide section 123 of the stem 120. Of course, in other embodiments it may be possible for the stem snap element 130 and/or the stem rotational alignment element 140 to be located partially or fully on the stem guide section 123 or the stem interference section 124. Furthermore, the stem snap element 130 and the stem rotational alignment element 140 are arranged so that they intersect, as described in more detail below.

The stem body 121 has an outer surface 125 that extends along each of the stem base, stem guide, and stem interference sections 122, 123, 124 thereof. In the exemplified embodiment, the stem snap element 130 comprises a stem ring 131 that protrudes from and extends circumferentially around the outer surface 125 of the stem body 120. More specifically, the stem ring 131 protrudes from the outer surface 125 of the stem body 120 along the stem base section 122 thereof. In the exemplified embodiment, the stem ring 131 is a ring-shaped protuberance that extends continuously around the stem base section 122 of the stem 120. However, in the exemplified embodiment the stem ring 131 does not form a closed geometric shape because the stem ring 131 does not extend from the stem base section 122 of the stem 120 along its entire circumference.

Furthermore, although in the exemplified embodiment the stem ring 131 extends continuously around the stem base section 122 of the stem 120 (for most, but not all, of the circumference of the stem base section 122), the invention is not to be so limited in all embodiments. In other embodiments, the stem ring 131 may comprise spaced apart ring segments that protrude from the outer surface 125 of the stem 120 along the stem base section 122 thereof. Thus, the stem ring 131 of the stem snap element 130 extends from an annular or circumferential portion of the outer surface 125 of the stem 120 and it could be a full ring or some part of a full ring. The stem ring 131 could also be formed by a plurality of spaced apart and discrete protuberances that are arranged around a ring-shape. Moreover, although in the exemplified embodiment the stem ring 131 is described and shown as a protuberance, in other embodiments the stem ring 131 could be a groove having the same shape (i.e., a full or partial ring-shaped groove that is continuous or formed from spaced apart groove segments).

In the exemplified embodiment, the stem rotational alignment element 140 is positioned on the stem base section 122 as noted previously. More specifically, the stem rotational alignment element 140 and the stem snap element 130 are positioned on the stem base section 122 of the stem 120 so that a first reference plane RP1 that is transverse to the stem axis A-A intersects both the stem rotational alignment element 140 and the stem snap element 130. An entirety of the stem snap element 130 may lie on the first reference plane RP1. In the exemplified embodiment, the stem rotational alignment element 140 comprises a stem rib 141 that protrudes from the outer surface 125 of the stem body 121. Furthermore, the stem rib 141 is elongated in an axial direction of the stem body 121 such that the stem rib 141 is elongated in a direction parallel to the stem axis A-A. In the exemplified embodiment, the stem rib 141 has a rectangular shape, although the invention is not to be so limited in all embodiments and the stem rib 141 can take on other shapes while still performing its intended function as noted herein.

In the exemplified embodiment, the stem rib 141 of the stem rotational alignment element 140 extends directly from the distal end 112 of the gripping portion 110 of the handle 100 and terminates at a free distal end 142 that is located on the stem base section 122 at a distance away from the stem guide section 123. The stem rib 141 has a first side surface 143 and a second side surface 144 each of which extends from the distal end 112 of the gripping portion 110 of the handle 100 to the free distal end 142. The stem rib 141 of the stem rotational alignment element 140 may extend for at least 70%, or at least 80%, or at least 90% of the length of the stem base section 122 of the stem 120.

The stem rib 141 of the stem rotational alignment element 140 extends along the stem base section 122 in a manner such that it intersects the stem ring 131 of the stem snap element 130. Thus, as mentioned above, in the exemplified embodiment the stem ring 131 does not form a full ring, but rather the stem ring 131 forms a portion of a ring having a first end 132 and a second end 133 that are circumferentially spaced apart from one another by a gap. The stem rib 141 extends along and within the gap between the first and second ends 132, 133 of the stem ring 131 and protrudes both above and below the stem ring 131. Stated another way, the stem ring 131 terminates at the opposing first and second side surfaces 143, 144 of the stem rib 141. There is no gap or space between the first end 132 of the stem ring 133 and the first side surface 143 of the stem rib 141 and there is no gap or space between the second end 133 of the stem ring 133 and the second side surface 144 of the stem rib 141. Rather, the stem ring 131 terminates at the stem rib 141.

Figure 6:
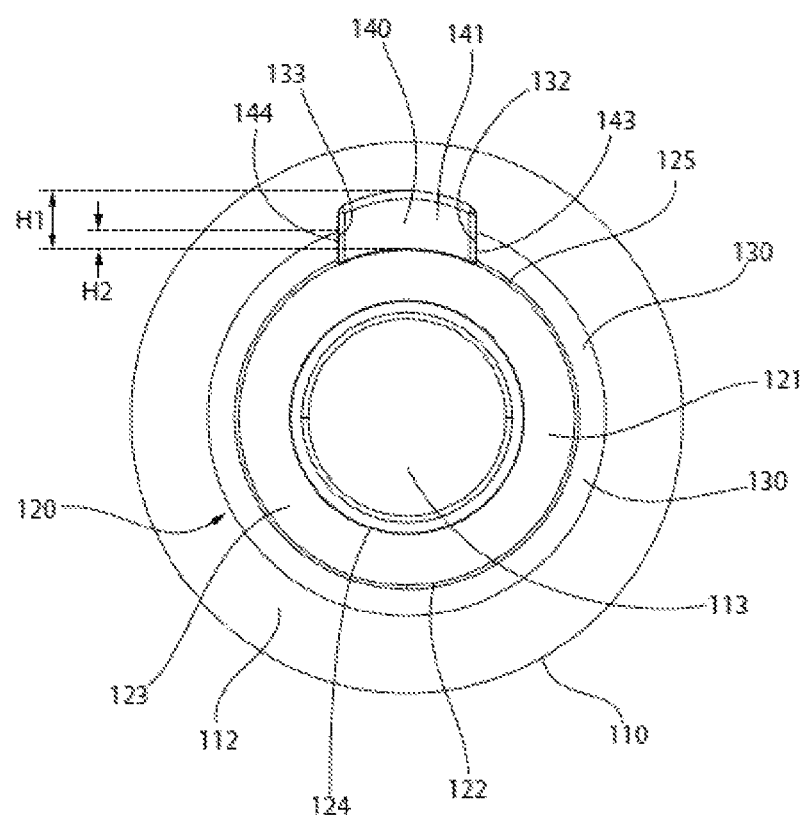
FIG. 6 is a top view of the handle of the oral care implement of FIG. 1.

Referring briefly to FIG. 6, the stem rib 141 protrudes a first height H1 from the outer surface 125 of the stem body 121. The stem ring 131 protrudes a second height H2 from the outer surface 125 of the stem body 121. In the exemplified embodiment, the first height H1 is greater than the second height H2 (or the second height H2 is less than the first height H1). In the exemplified embodiment, a ratio of H1 to H2 is at least 2:1 such that the first height is at least twice the second height.

Referring again to FIGS. 3-5, in the exemplified embodiment the stem 120 comprises an annular groove 126 in the outer surface 125 of the stem body 121. Specifically, the annular groove 126 is formed into the stem body 121 between the stem guide section 123 and the stem interference section 124. The annular groove 126 forms a V-shaped cutout or notch in the stem body 121 between the stem guide section 123 and the stem interference section 124. The annular groove 126 could be omitted in other embodiments.

Figure 7:
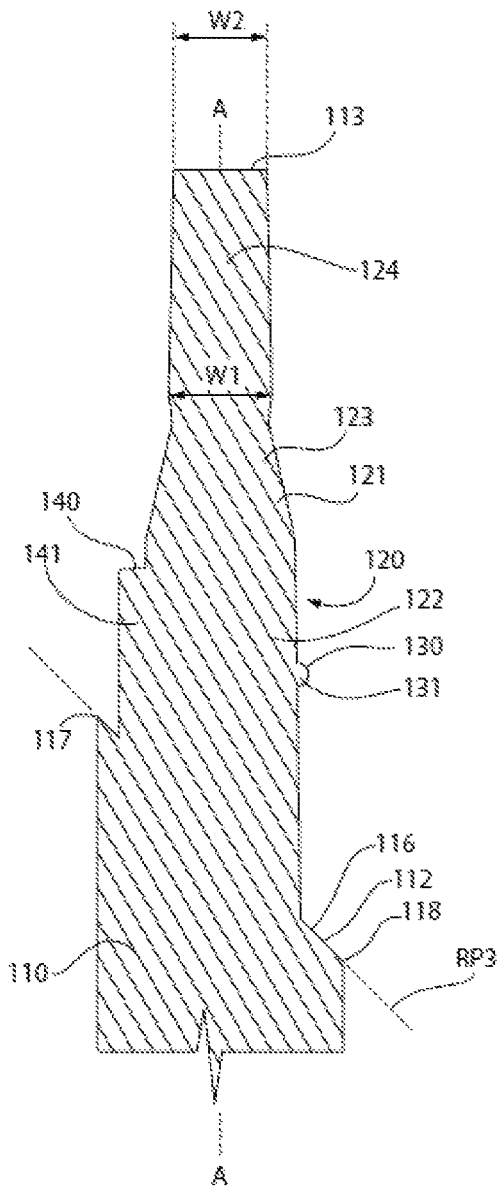
FIG. 7 is a cross-sectional view taken along line VII-VII of FIG. 4.
Figure 8:
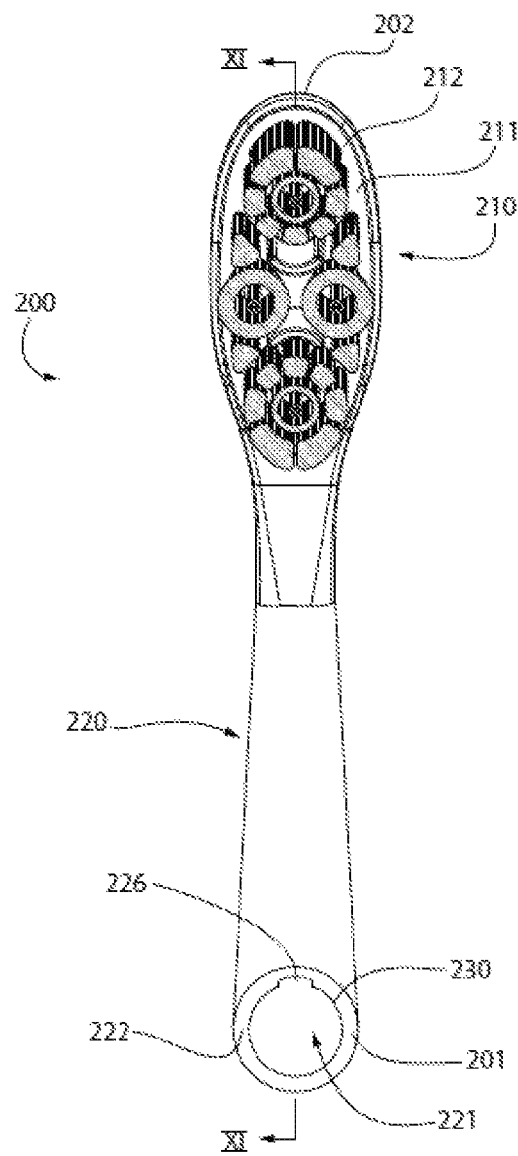
FIG. 8 is a front view of the oral care refill head of FIG. 1.
Figure 9:
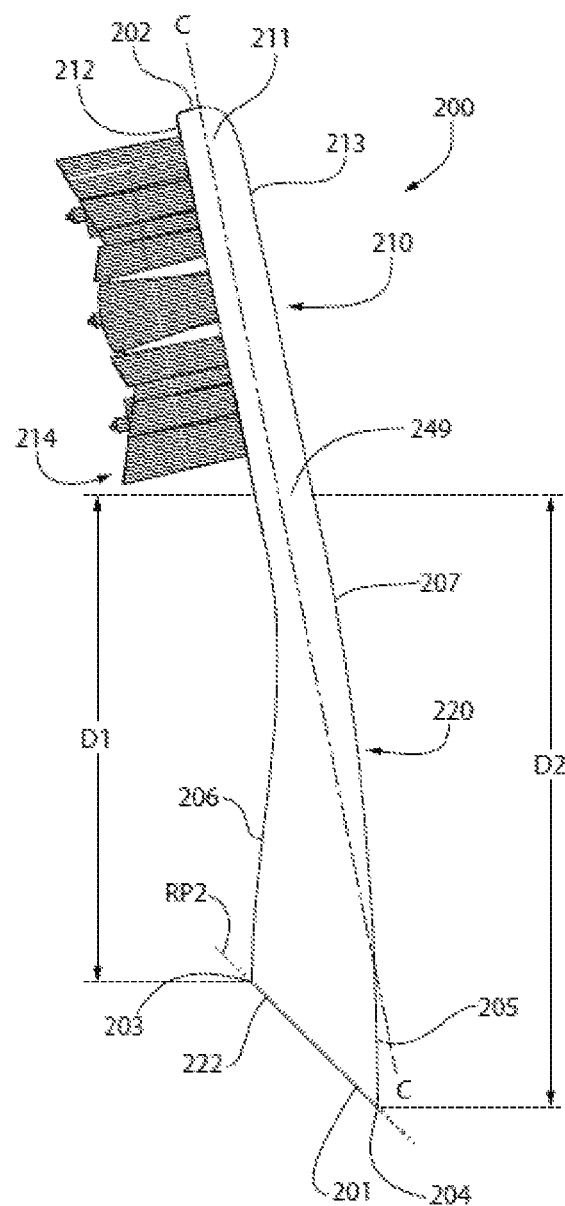
FIG. 9 is a side view of the oral care refill head of FIG. 1.
Figure 10:
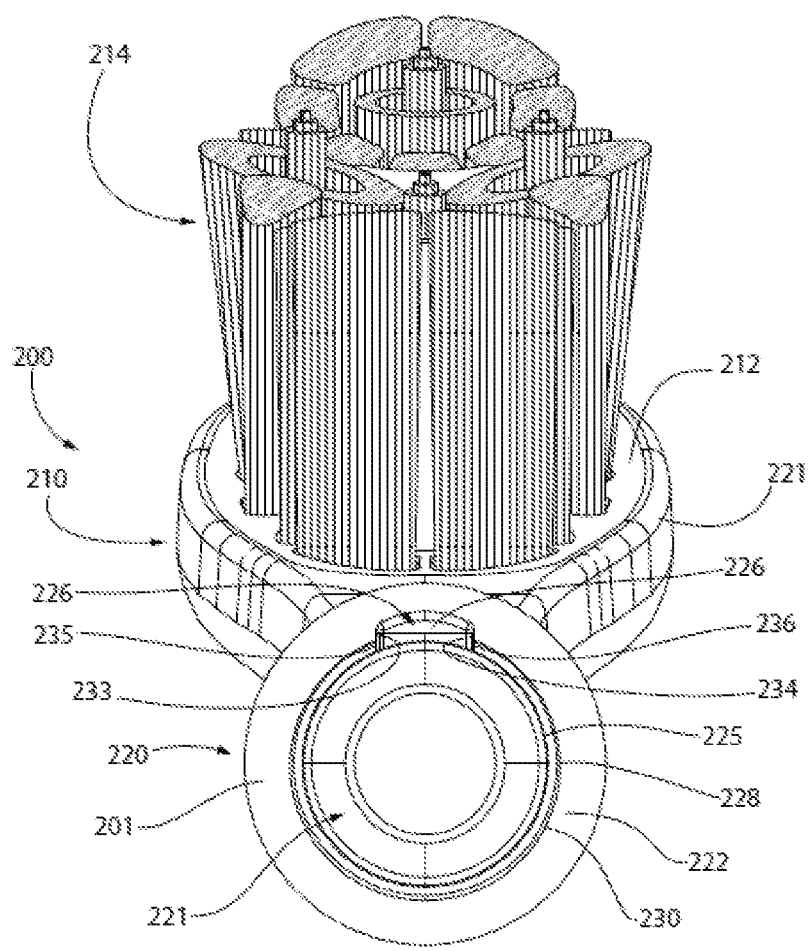
FIG. 10 is a bottom view of the oral care refill head of FIG. 1.
Figure 11:
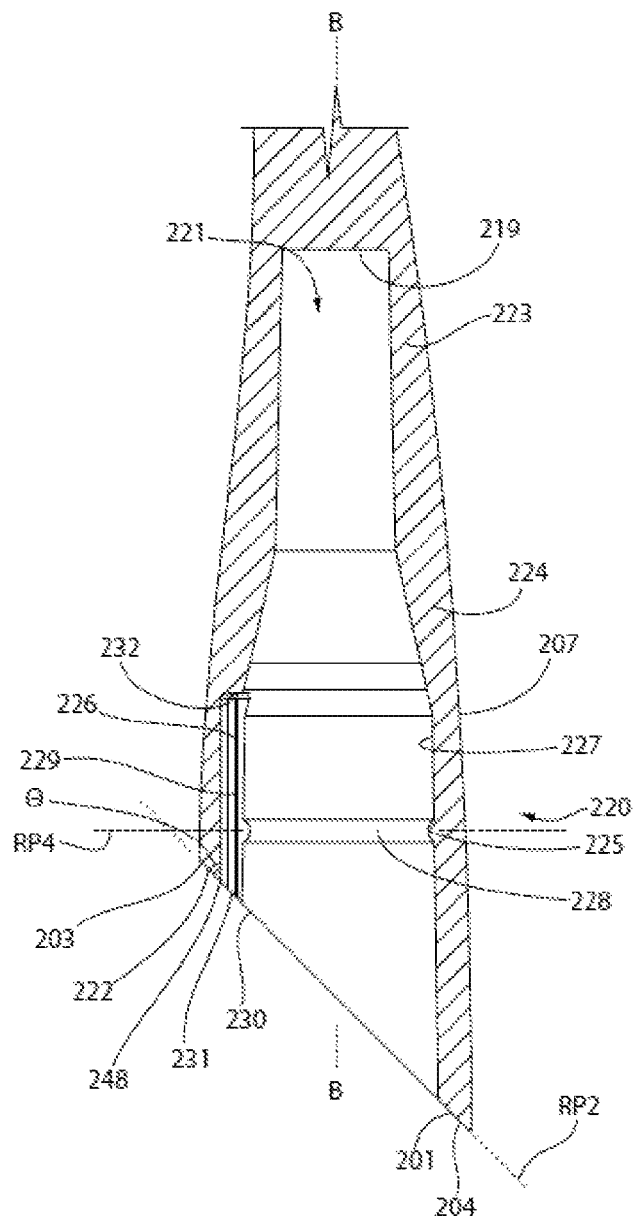
FIG. 11 is a cross-sectional view taken along line XI-XI of FIG. 8.

Referring to FIGS. 5 and 7, the handle 100 will be further described. First, the distal end 112 of the gripping portion 110 of the handle 100 will be further described. In the exemplified embodiment, the distal end 112 of the gripping portion 110 of the handle 100 comprises an annular shoulder surface 116 that circumscribes the stem 120. Furthermore, in the exemplified embodiment the annular shoulder surface 116 lies in a third reference plane RP3. The third reference plane RP3 is oblique to the stem axis A-A. The annular shoulder surface 116 comprises a high point 117 and a low point 118 when viewed in side profile as shown in FIG. 5. The low point 118 is located closer to the proximal end 111 of the gripping portion 110 than the high point 117. Furthermore, the high point 117 is circumferentially aligned with the stem rotational alignment element 140. Thus, the high point 117 and the stem rotational alignment element 140 are located at the same rotational position about the stem axis A-A, although the high point 117 and the stem rotational alignment element 140 may be at different radial distances from the axis and/or at different axial positions in other embodiments.

As noted above, the stem guide section 123 is the axial section of the stem body 121 that is between the stem base section 122 and the stem interference section 124. The stem guide section 123 has a conical shape in that its width decreases as it extends further from the stem base section 122 and closer to the stem interference section 124. More specifically, the stem guide section 123 has a transverse cross-sectional area that tapers with increasing distance from the distal end 112 of the gripping portion 110 of the handle 100. The stem guide section 123 has a fairly significant taper that is noticeable simply by viewing the stem.

In the exemplified embodiment, the stem interference section 124 also tapers. Specifically, the stem interference section 124 has a transverse cross-sectional area that tapers with increasing distance from the distal end 112 of the gripping section 110 of the handle 100. However, as seen in the drawings, the taper of the stem interference section 124 is quite minor such that it is almost imperceptible in the drawings. That said, in this embodiment the stem interference section 124 does taper as described. Stated another way, the stem interference section 124 has a first transverse width W1 adjacent to the stem guide section 123 and a second transverse width W2 at the distal end 113 of the handle 100, the first transverse width W1 being greater than the second transverse width W2. In the exemplified embodiment, the transverse cross-sectional area of the stem guide section 123 has a greater degree of taper than the transverse cross-sectional area of the stem interference section 124.

Referring to FIGS. 8-11, the oral care refill head 200 will be further described. As mentioned previously, the oral care refill head 200 comprises the oral care treatment portion 210 and the sleeve portion 220. Specifically, the oral care treatment portion 210 comprises the head body 211 having a front surface 212 from which the tooth cleaning elements 214 extend and an opposite rear surface 213. The oral care refill head 200 extends from the proximal end 201 that is formed by the proximal edge surface 222 of the sleeve portion 220 to a distal end 202 that is formed by the terminal end of the oral care treatment portion 210.

In this embodiment, the proximal edge surface 222 of the sleeve portion 220 defines an opening 230 into the sleeve cavity 221. Thus, the sleeve cavity 221 is open at the proximal edge surface 222 of the sleeve portion 220. The sleeve cavity 221 extends along a cavity axis B-B. Furthermore, in this embodiment the proximal edge surface 222 of the sleeve portion 220 lies in a second reference plane RP2 that is oblique to the cavity axis B-B. This allows the proximal edge surface 222 of the sleeve portion 220 to abut the annular shoulder surface 116 of the handle 100 when the oral care refill head 200 is coupled to the handle 100.

Due to the oblique orientation of the proximal edge surface 222 of the sleeve portion 220, a front portion 203 of the proximal edge surface 222 of the sleeve portion 220 is located a first axial distance D1 from a distal end 249 of the sleeve portion 220. A rear portion 204 of the proximal edge surface 222 of the sleeve portion 220 is located a second axial distance D2 from the distal edge 249 of the sleeve portion 220. The second axial distance D2 is greater than the first axial distance D1. This is because the proximal edge surface 222 of the sleeve portion 220 is angled upwardly in a direction from a rear surface 205 of the sleeve portion 220 (which faces generally the same direction as the rear surface 213 of the head body 211) to a front surface 206 of the sleeve portion 220 (which faces generally the same direction as the front surface 212 of the head body 211). Thus, the front portion 203 of the proximal edge surface 222 of the sleeve portion 220 is a high point of the proximal edge surface 222 and the rear portion 204 of the proximal edge surface 222 of the sleeve portion 220 is a low point of the proximal edge surface 222, when viewed in side profile. The front portion 203 of the proximal edge surface 222 of the sleeve portion 220 comprises an inner apex 248 having an acute angle θ.

The head body 211 of the oral care refill head 200 extends along a head longitudinal axis C-C that is inclined relative to the cavity axis B-B. Thus, in the exemplified embodiment the head longitudinal axis C-C is inclined forward moving from a proximal end of the head body 211 that is adjacent to the sleeve portion 220 to a distal end of the head body 211 (which is also the distal end 202 of the oral care refill head 200).

The sleeve portion 220 of the oral care refill head 100 comprises a sleeve interference section 223, a sleeve guide section 224, a sleeve snap element 225, and a sleeve rotational alignment element 226. The sleeve guide section 224 is located between the sleeve interference section 223 and the sleeve snap element 225. The sleeve guide section 224 is also located between the sleeve interference section 223 and the sleeve rotational alignment element 226. Further, the sleeve guide section 224 is located between the sleeve interference section 223 and the proximal edge surface 222 of the sleeve portion 220. The sleeve interference section 223 forms a distal-most section of the sleeve cavity 221 and comprises an end wall 219 of the sleeve cavity 221.

As seen in the drawings, the sleeve cavity 221 has a transverse cross-sectional area that tapers with distance from the proximal end 201 of the sleeve portion 220 in the sleeve guide section 224. Stated another way, the sleeve guide section 224 comprises a portion of the sleeve cavity 221 that tapers as the distance from the proximal end 201 of the sleeve portion 220 increases. This enables the portion of the sleeve cavity 221 associated or aligned with the sleeve guide section 224 to receive the stem guide section 123 of the stem 120 of the handle 100 when the oral care refill head 200 is coupled to the handle 100.

Furthermore, although less perceptible in the drawings, the transverse cross-sectional area of the sleeve cavity 221 also tapers with increasing distance from the proximal end 201 of the sleeve portion 220 in the sleeve interference section 223. Thus, the sleeve cavity 221 tapers along both the sleeve guide section 224 and the sleeve interference section 223. However, the transverse cross-sectional area of the sleeve cavity 221 in the sleeve guide section 224 has a greater degree of taper than the transverse cross-sectional area of the sleeve cavity 221 in the sleeve interference section 223.

The sleeve cavity 221 is defined by an inner surface 227 of the sleeve portion 220. In the exemplified embodiment, the sleeve snap element 225 comprises a sleeve ring 228 that protrudes from the inner surface 227 of the sleeve portion 220. Moreover, the sleeve ring 228 extends circumferentially around the inner surface 227 of the sleeve portion 220. However, the sleeve ring 228 does not extend along the entirety of the circumference of the inner surface 227 of the sleeve portion 220. Rather, the sleeve ring 228 is interrupted by the sleeve rotational alignment element 226, as described further below. In the exemplified embodiment, however, the sleeve ring 228 of the sleeve snap element 225 is a continuous protrusion that extends from the inner surface 227 of the sleeve portion 220 along an entire circumference thereof with the exception of the location of the sleeve rotational alignment element 226. However, the invention is not to be so limited in all embodiments and the sleeve ring 228 of the sleeve snap element 225 could comprise a plurality of ring segments that are spaced apart from one another. Moreover, in yet another embodiment the sleeve snap element 225 could comprise a groove instead of a protuberance while still forming a snap-interlock with the stem snap element 130 described above.

In the exemplified embodiment, the sleeve snap element 225 is spaced a distance from the proximal end 222 of the sleeve portion 220 towards the oral treatment portion 210. Thus, the sleeve snap element 225 is circumscribed by a wall of the sleeve portion 220. Stated another way, the sleeve snap element 225 is surrounded on all sides by a portion of the wall of the sleeve portion 220. The sleeve snap element 225 does not extend to the proximal end 222 of the sleeve portion 220 in the exemplified embodiment.

In the exemplified embodiment, the sleeve rotational alignment element 226 comprises a sleeve groove 229 formed into the inner surface 227 of the sleeve portion 220 that defines the sleeve cavity 221. Thus the sleeve rotational alignment element 226 is located in the sleeve cavity 221. The sleeve groove 229 extends axially from an open groove end 231 in the proximal edge 201 of the sleeve portion 220 to a closed groove end wall 232. The open groove end 231 of the sleeve groove 229 of the sleeve rotational alignment element 226 forms a part of the opening 230 into the sleeve cavity 221 at the proximal edge surface 222 of the sleeve portion 220. Thus, the sleeve groove 229 of the sleeve rotational alignment element 226 extends upward from the front portion 203 of the proximal edge surface 222 of the sleeve portion 220. In the circumferential direction, the sleeve groove 229 has a first side wall 233 and a second side wall 234. In the exemplified embodiment, the sleeve rotational alignment element 226 is circumferentially aligned with the front surface 212 of the head body 211 of the oral treatment portion 210 of the oral care refill head 200. However, the sleeve rotational alignment element 226 could be located at other circumferential positions in other embodiments.

The sleeve snap element 225 and the sleeve rotational alignment element 226 are positioned on the sleeve so that a fourth reference plane RP4 that is transverse to the cavity axis A-A intersects both the sleeve snap element 225 and the sleeve rotational alignment element 226. Thus, the sleeve snap element 225 and the sleeve rotational element 226 are at least partially axially aligned with one another and the sleeve snap element 225 intersects the sleeve rotational alignment element 226. The sleeve snap element 225 extends from a first end 235 that terminates at the first side wall 233 of the sleeve rotational alignment element 226 to a second end 236 that terminates at the second side wall 234 of the sleeve rotational alignment element 226. As mentioned previously, the sleeve groove 229 of the sleeve rotational alignment element 226 creates a space or gap in the sleeve ring 228 of the sleeve snap element 225 in the exemplified embodiment.

The sleeve portion 220 of the oral care refill head 200 has an outer surface 207 that includes the front and rear surfaces 205, 206. The outer surface 207 extends from the distal end 249 of the sleeve portion 220 to the proximal edge surface 222 of the sleeve portion 220. In the exemplified embodiment, there are no openings, apertures, slits, or the like formed into the outer surface 207 of the sleeve portion 220. Thus, there are no relief slots or the like that extend from the outer surface 207 to the inner surface 227 to form passageways into the cavity 221 from the outer surface 225. In the exemplified embodiment, the entire connection between the oral care refill head 200 and the handle 100 is accomplished by features, elements, and components that are located within or form a part of the sleeve cavity 221.

Figure 12A:
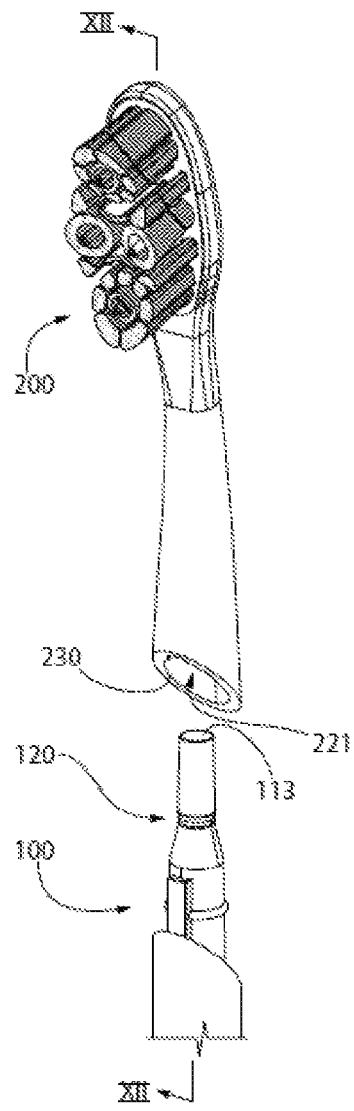
FIG. 12A is a perspective view illustrating the oral care refill head of FIG. 1 positioned in alignment with a stem portion of the handle of FIG. 1 for attachment thereto.
Figure 12B:
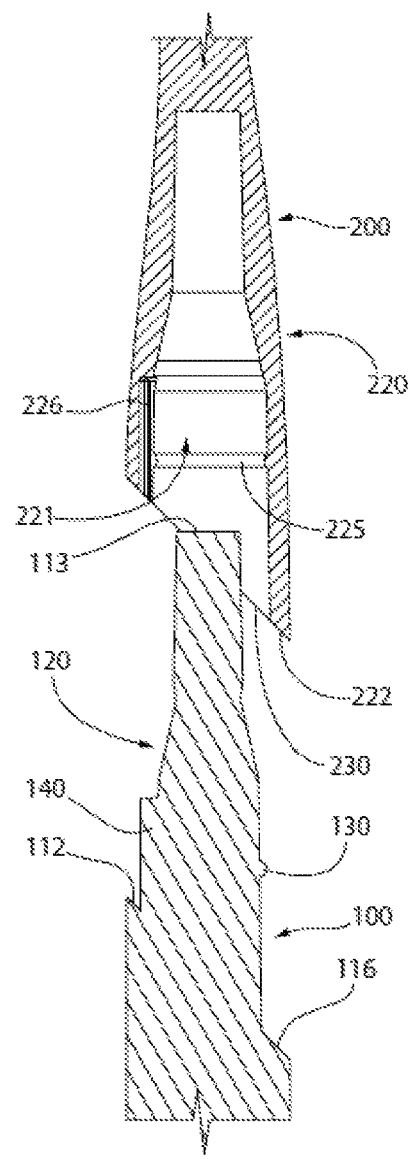
FIG. 12B is a cross-sectional view taken along line XII-XII of FIG. 12A.

FIGS. 12A-14B illustrate the process of coupling the oral care refill head 200 to the handle 100 in partial perspective views along with a matching cross-sectional view. As shown in FIGS. 12A and 12B, the first step is to align the opening 230 of the sleeve cavity 221 with the stem 120 of the handle 100, and particularly with the distal end 113 of the handle 100.

Figure 13A:
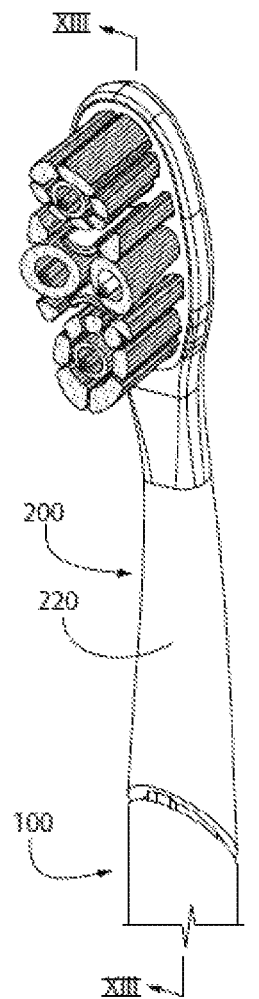
FIG. 13A is a perspective view illustrating the stem portion of the handle of FIG. 1 partially inserted into a cavity of the oral care refill head of FIG. 1.
Figure 13B:
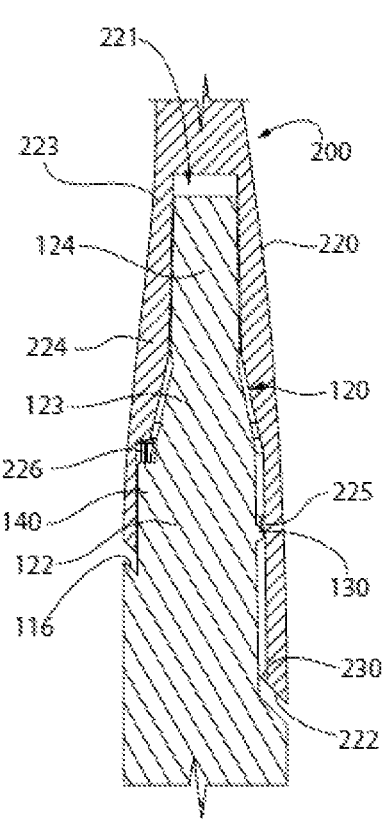
FIG. 13B is a cross-sectional view taken along line XIII-XIII of FIG. 13A.
Figure 15:
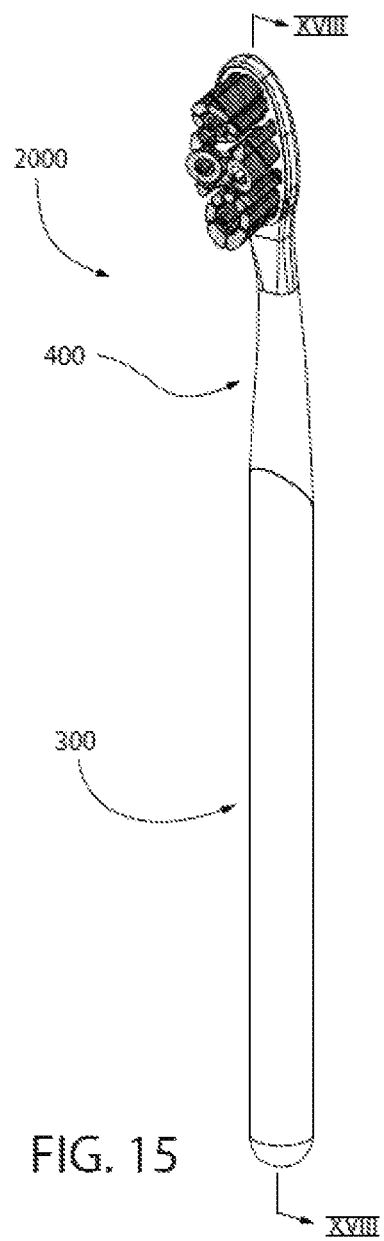
FIG. 15 is a perspective view of an oral care implement having a handle and an oral care refill head in accordance with an alternative embodiment of the present invention.
Figure 16:
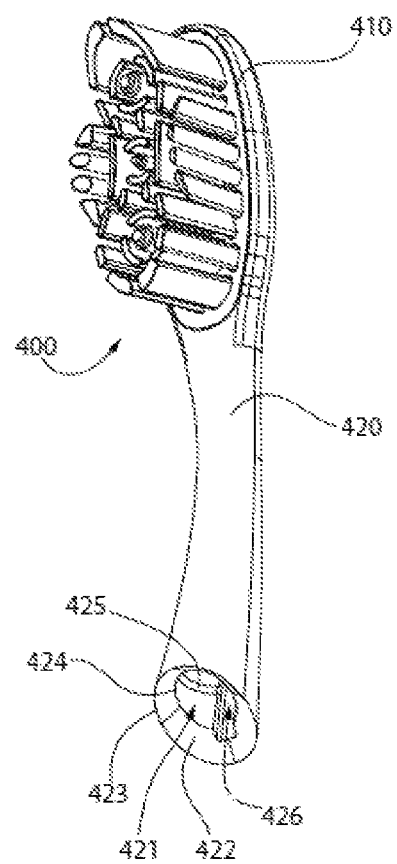
FIG. 16 is a perspective view of the handle of FIG. 15.
Figure 17:
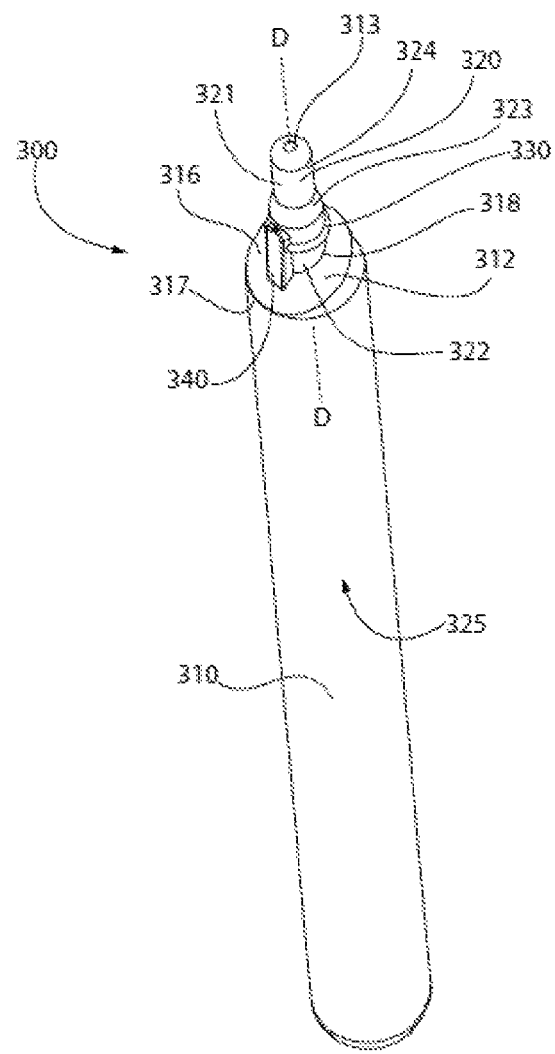
FIG. 17 is a perspective view of the oral care refill head of FIG. 15.
Figure 18:
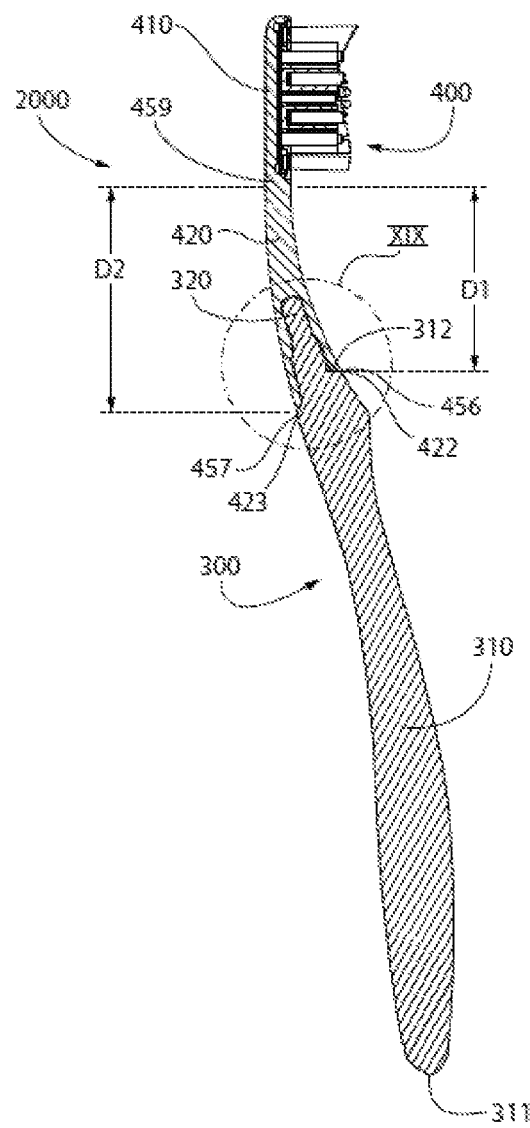
FIG. 18 is a cross-sectional view taken along line XVIII-XVIII of FIG. 15.
Figure 19:
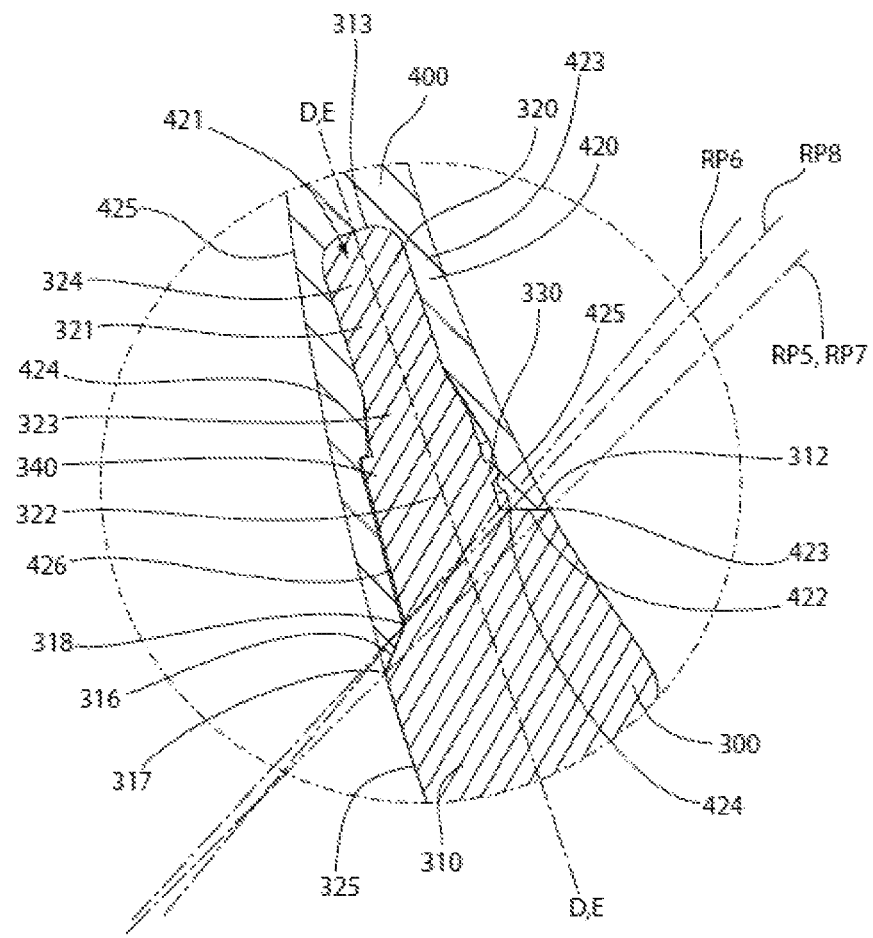
FIG. 19 is a close-up view of area XIX of FIG. 16.

Next, referring to FIGS. 13A and 13B, the oral care refill head 200 is lowered so that the stem 120 of the handle 100 enters the sleeve cavity 221 of the sleeve portion 220 of the oral care refill head 200. The stem rotational alignment element 140 must be rotationally/circumferentially aligned with the sleeve rotational alignment element 226 in order for the stem 120 to be inserted into the sleeve cavity 221 as deeply as shown in FIGS. 13A and 13B. Specifically, the stem interference section 124 and the stem guide section 123 of the stem 120 can pass through the opening 230 in the proximal end 222 of the sleeve portion 220 without regard to the relative rotational orientations of the oral care refill head 200 and the handle 100. However, if the oral care refill head 200 and the handle 100 are not properly oriented relative to one another, the stem rib 141 of the stem rotational alignment element 140 will bump against the proximal edge surface 222 of the sleeve portion 220 of the oral care refill head 200 and prevent further insertion of the stem 120 into the sleeve cavity 221. If such bumping occurs, this should prompt the user to rotate the oral care refill head 200 relative to the handle 100 until the stem rotational alignment element 140 is aligned with the sleeve rotational alignment element 226. When this is achieved, the stem 120 will be able to be further inserted into the sleeve cavity 221 such that the stem rotational alignment element 140 mates with and nests within the sleeve rotational alignment element 226 as shown in FIG. 13B.

In FIGS. 13A and 13B, the stem 120 of the handle 100 is partially nested within the sleeve cavity 221 of the oral care refill head 200 to the point that the stem snap element 130 is abutting against the sleeve snap element 225. As noted previously, in the exemplified embodiment both the stem snap element 130 and the sleeve snap element 225 are protuberances. Thus, when the stem 120 is inserted into the sleeve cavity 221 to the extent as shown in FIG. 13B, an additional force is required by the user to force the stem snap element 130 to move axially past the sleeve snap element 225. In other embodiments, at least one of the stem snap element 130 and the sleeve snap element 225 may be a groove instead of a protuberance.

Referring to FIGS. 14A and 14B, the oral care refill head 200 is illustrated in the second state in which it is fully coupled to the handle 100. As can be seen, the stem snap element 130 has passed over the sleeve snap element 225, thereby creating a snap-fit interlock between the stem snap element 130 and the sleeve snap element 225. This may be achieved by the sleeve portion 220 of the oral care refill head 200 flexing slightly outward as the stem snap element 130 passes over the sleeve snap element 225. Once the snap-fit interlock between the stem snap element 130 and the sleeve snap element 225 is achieved, the oral care refill head 200 is securely coupled to the handle 100 such that a force that overcomes the snap-fit interlock is required to be applied to the oral care refill head 200 and/or the handle 100 in opposite directions in order to detach the oral care refill head 200 from the handle 100.

In addition, when the oral care refill head 200 is coupled to the handle 100, the stem rib 141 of the stem rotational alignment element 140 nests within the sleeve groove 229 of the sleeve rotational alignment element. This not only ensures that the oral care refill head 200 is initially coupled to the handle 100 in the correct rotational orientation, but also prevents the oral care refill head 200 from being rotated relative to the handle 100 once the oral care refill head 200 is coupled to the handle 100. As noted herein, the oral care refill head 200 cannot be altered from the first state (whereby it is separated from the handle 100) to the second state (whereby it is coupled to the handle 100) unless the stem alignment element 140 and the sleeve alignment element 226 are circumferentially aligned (i.e., at the same rotational position about the stem and cavity axes A-A, B-B) with one another.

Furthermore, when the oral care refill head 200 is coupled to the handle 100, there is an interference fit between the stem interference section 124 and the sleeve interference section 123. In some embodiments, this means that there is a pressure, even if ever so slightly, applied by the inner surface 227 of the sleeve portion 220 of the oral care refill head 200 against an outer surface 129 of the stem interference section 124 of the stem 120. Specifically, the external dimension of the stem interference section 124 (i.e., the width measured in a direction transverse to the stem axis A-A) may be slightly greater than the internal dimension of the sleeve interference section 223 (i.e., the width of the sleeve cavity 221 along the sleeve interference section 223 measured in a direction transverse to the cavity axis B-B).

As a result, when the stem interference section 124 nests within the sleeve cavity 221 along the sleeve interference section 223, the stem interference section 124 fits snugly therein. This interference fit between the stem interference section 124 and the sleeve interference section 223 may prevent relative movement (rocking, rattling, shaking, or the like) between the oral care refill head 200 and the handle 100 during use of the oral care implement 1000. In some embodiments, the interference fit formed between the stem interference section 124 and the sleeve interference section 223 may extend a length that is 25% or more of a total length of the stem 120.

Moreover, as mentioned previously, in the exemplified embodiment the stem 120 comprises the annular groove 126. Thus, when the stem 120 is disposed within the sleeve cavity 221, an annular space 160 is formed between a floor of the annular groove 126 and the inner surface 227 of the sleeve portion 220. Moreover, although in the exemplified embodiment the annular groove 126 is formed into the stem 120, in other embodiments an annular groove that is aligned with the annular space 160 may be formed into the inner surface 227 of the sleeve portion 220 rather than it being formed into the stem 120. Thus, the annular groove 126 may be formed in one of the sleeve portion 220 or the stem 120 to form the annular space 160 when the stem 120 nests within the sleeve cavity 220. In either case, the annular space 160 is located at an axial position between the interference fit and the snap-fit interlock. Furthermore, in the exemplified embodiment the annular space 160 is adjacent to the interference fit and located along the junction of the sleeve interference section 124 and the sleeve guide section 123.

Furthermore, when the oral care refill head 200 is in the second state and coupled to the handle 100, the stem guide section 123 of the stem 120 nests within the sleeve guide section 224 of the sleeve portion 220. The sleeve guide section 224 is configured to axially orient the stem 120 within the sleeve cavity 221 through the interaction between the stem guide section 123 of the stem 120 and the sleeve guide section 224 of the sleeve portion 220 during insertion of the stem 120 into the sleeve cavity 221. In the second state, a gap 161 may exist between the stem guide section 123 and the sleeve guide section 224.

Finally, when the oral care refill head 200 is in the second state and coupled to the handle 100, the proximal edge surface 222 of the sleeve portion 220 of the oral care refill head 200 is adjacent to or abuts the shoulder 116 at the distal end 112 of the gripping portion 110 of the handle 100. More specifically, the proximal edge surface 222 of the sleeve portion 220 of the oral care refill head 200 is in abutment with the annular shoulder surface 116 of the gripping portion 110 of the handle 100. The snap-fit interlock between the stem snap element 130 and the sleeve snap element 225 biases or forces the proximal edge surface 222 of the sleeve portion 220 against (into abutment with) the annular shoulder surface 116 of the gripping portion 110 of the handle 100. As noted previously, the annular shoulder surface 116 lies on a third reference plane RP3 and the proximal edge surface 222 lies on a second reference plane RP2. When the oral care refill head 200 is attached to the handle 100, the second and third reference planes RP2, RP3 are parallel to one another.

Thus, in accordance with the exemplified embodiment, there are multiple features and/or points of contact between the oral care refill head 200 and the handle 100 that help to facilitate the coupling therebetween. The multiple features include: (1) the interference fit between the sleeve interference section 223 and the stem interference section 124; (2)

the snap-fit interlock between the sleeve snap element 225 and the stem snap element 130; (3) the mating between the sleeve rotational alignment element 226 and the stem rotational alignment element 140 to prevent relative rotation between the handle 100 and the oral care refill head 200; and (4) the abutment between the proximal edge surface 222 of the sleeve portion 220 of the oral care refill head 200 and the annular shoulder surface 116 at the distal end 112 of the handle portion 110 of the handle 100. Various embodiments may include any of one or more of these four features in accordance with the teachings set forth herein to achieve an acceptable coupling between the oral care refill head 200 and the handle 100.

Referring to FIGS. 15-19, an oral care implement 2000 is illustrated in accordance with another embodiment of the present invention. The oral care implement 2000 is identical to the oral care implement 1000 described above, except with regard to the differences described below. Therefore, to the extent that features of the oral care implement 2000 are not described in detail herein, it should be appreciated that the features of the oral care implement 1000 are applicable. Features of the oral care implement 2000 that are the same as features of the oral care implement 1000 are similarly numbered, except the 300 and 400 series of numbers are used for the oral care implement 2000 instead of the 100 and 200 series of numbers which were used for the oral care implement 1000. The disclosure of the present invention should be deemed to include combinations of the features of the oral care implements 1000, 2000 described herein so long as they do not conflict.

The oral care implement generally comprises a handle 300 and an oral care refill head 400. The details of the oral care implement 2000 that differ from the oral care implement 1000 relate to features based around the connection and coupling between the handle 300 and the oral care refill head 400. Specifically, the handle 300 comprises a gripping portion 310 and a stem 320. The gripping portion 310 extends from a proximal end 311 to a distal end 312. The stem 320 extends along a stem axis D-D and protrudes from the distal end 312 of the gripping portion 310. Thus, the distal end 312 of the gripping portion 310 comprises an annular shoulder surface 316 that circumscribes the stem 320.

The stem 320 comprises a stem body 321, which protrudes from the distal end 312 of the gripping portion 310 of the handle 300 and terminates at a distal end 313 of the handle 300. The stem 320 (and the stem body 321 thereof) extends along the stem axis A-A from the distal end 312 of the gripping portion 310 of the handle 300 to the distal end 313 of the handle 300. In the exemplified embodiment, the stem body 21 comprises a stem base section 322, a stem guide section 323, and a stem interference section 324. The stem base section 322, the stem guide section 323, and the stem interference section 324 all form a part of the monolithic stem body 121 in the exemplified embodiment.

In the exemplified embodiment, the stem 320 comprises a stem snap element 330 and a stem rotational alignment element 340. In the exemplified embodiment the stem snap element 330 and the stem rotational alignment element 340 are located on the stem base section 322 of the stem 320. More specifically, in the exemplified embodiment the stem snap element 330 and the stem rotational element 340 are located entirely on the stem base section 322 such that no portion of the stem snap element 330 or the stem rotational element 340 extends onto the stem guide section 323 of the stem 320. Of course, in other embodiments it may be possible for the stem snap element 330 and/or the stem rotational alignment element 340 to be located partially or fully on the stem guide section 323 or the stem interference section 324. Furthermore, the details of the stem snap element 130 and the stem rotational alignment element 140 described above are applicable to the stem snap element 330 and the stem rotational alignment element 340.

The annular shoulder surface 316 of the distal end 312 of the gripping portion 310 of the handle 300 extends radially from an outer shoulder edge 317 to an inner shoulder edge 318, with the inner shoulder edge 318 being adjacent to the stem 320 and the outer shoulder edge 317 being adjacent to an outer surface 325 of the handle 300. In this embodiment, the annular shoulder surface 316 is inclined downwardly and away from the stem 320. That is, an entirety of the annular shoulder surface 316 is inclined downwardly and away from the stem 320. The term downwardly as used herein means away from the distal end 313 of the handle 310 and towards the proximal end 311 of the handle 310. Thus, the annular shoulder surface 316 is inclined downwardly away from the stem 320 and away from the distal end 313 of the handle 310 with increasing distance from the stem axis D-D in the exemplified embodiment. It may be possible to incline the annular shoulder surface 316 in the opposite direction in some alternative embodiments. Thus, the annular shoulder surface 316 could be inclined upwardly towards the distal end of the stem 320 with increasing distance from the stem axis D-D in other embodiments. The inner shoulder edge 318, which is an annular edge that surrounds the stem 320, is located further from the proximal end 311 of the handle 310 than the outer shoulder edge 317, which is also an annular edge that surrounds the stem 320. Thus, the annular shoulder surface 316 may be a conical surface in some embodiments.

The annular shoulder surface 316 still has a high point and a low point as was discussed above with regard to the oral care implement 1000. However, in this embodiment the annular shoulder surface 316 does not, in its entirety, lie in a single plane. Rather, in this embodiment the outer shoulder edge 317 lies in a fifth reference plane RP5 that is oblique to the stem axis D-D. Furthermore, the inner shoulder edge 318 lies in a sixth reference plane RP6 that is oblique to the stem axis D-D.

In a similar fashion, the oral care refill head 400 comprises an oral care treatment portion 410 and a sleeve portion 420. The sleeve portion 420 comprises a sleeve cavity 421 extending along a cavity axis E-E. The sleeve portion 420 of the oral care refill head 400 comprises a sleeve interference section 423, a sleeve guide section 424, a sleeve snap element 425, and a sleeve rotational alignment element 426. The details of these features as described above with regard to the oral care implement 1000 and the refill head 200 are applicable except for the differences described herein below.

The sleeve portion 420 comprises a proximal edge surface 422 that defines an opening into the sleeve cavity 421. In the exemplified embodiment, the proximal edge surface 422 of the sleeve portion 420 extends radially from an outer sleeve edge 423 to an inner sleeve edge 424, with the inner sleeve edge 424 being closer to the cavity axis E-E than the outer sleeve edge 423. Furthermore, in the exemplified embodiment the proximal edge surface 422 is inclined downwardly away from the oral treatment portion 410 with increasing radial distance from the cavity axis E-E. That is, an entirety of the proximal edge surface 422 is inclined downwardly and away from the cavity axis E-E with increasing radial distance from the cavity axis E-E. As used herein, the term downwardly means that the proximal edge surface 422 is inclined in a direction away from the oral treatment portion 410 of the oral care refill head 400. Thus, in the exemplified embodiment, as the proximal edge surface 422 extends further from the cavity axis E-E, the proximal edge surface 422 also extends further from the oral treatment portion 410 of the oral care refill head 400. Thus, the proximal edge surface 422 forms a sort of funnel shape. Each of the inner sleeve edge 424 and the outer sleeve edge 423 forms an annular edge that surrounds the cavity axis E-E. The inner sleeve edge 424 is closer to the cavity axis E-E and closer to the oral care treatment portion 410 than the outer sleeve edge 423. In other embodiments, the proximal edge surface 422 may be inclined upwardly towards the oral care treatment portion 410.

The proximal edge surface 422 has a high point and a low point as discussed above with regard to the oral care implement 1000 that enables the proximal edge surface 422 to mate with the annular shoulder surface 316 when the oral care refill head 400 is coupled to the handle 300. The outer sleeve edge 423 of the proximal edge surface 422 lies in a seventh reference plane RP7 that is oblique to the cavity axis E-E (which, when the oral care refill head 400 is attached to the handle 300, is the same plane as the fifth reference plane RP5 in which the outer shoulder edge 317 of the annular shoulder surface 316 lies). Furthermore, the inner sleeve edge 424 of the proximal edge surface 422 lies in an eighth reference plane RP8 that is oblique to the cavity axis E-E. The seventh reference plane RP7 does not intersect any portion of the oral care refill head 400 other than the outer sleeve edge 423 of the proximal edge surface 422. Thus, no portion of the proximal edge surface 422 other than the outer sleeve edge 423 lies on the seventh reference plane RP7. The inner sleeve edge 424 does not lie in and is not intersected by the seventh reference plane RP7 in which the outer sleeve edge 423 lies, and the outer sleeve edge 423 does not lie in and is not intersected by the eighth reference plane RP8 in which the inner sleeve edge 424 lies. The entirety of the proximal edge surface 422 with the exception of the inner sleeve edge 424 is located on one side of the eighth reference plane RP8 and the rest of the oral care refill head 400 is located on the other side of the eighth reference plane RP8.

In this embodiment, a front portion 456 of the outer sleeve edge 423 of the proximal edge surface 422 of the sleeve portion 420 is located at a first axial distance D1 from a distal end 459 of the sleeve portion 420. Furthermore, a rear portion 457 of the outer sleeve edge 423 of the proximal edge surface 422 of the sleeve portion 420 is located at a second axial distance D2 from the distal end 459 of the sleeve portion 420. In the exemplified embodiment, the second axial distance D2 is greater than the first distance D1 (best seen in FIG. 18). Thus, the front portion 456 of the outer sleeve edge 423 of the proximal edge surface 422 of the sleeve portion 420 is the high point of the proximal edge surface 422 and the rear portion 457 of the outer sleeve edge 423 of the proximal edge surface 422 of the sleeve portion 420 is the low point of the proximal edge surface 422, when viewed in side profile (and see in the sectional view of FIG. 18).

When the oral care refill head 400 is in the second state (i.e., coupled to the handle 300), the stem 320 of the handle 300 is disposed within the sleeve cavity 421 of the sleeve portion 420 of the oral care refill head 400 so that the proximal edge surface 422 of the oral care refill head 400 is adjacent to (or in abutting contact with) the annular shoulder surface 316 of the handle 300. Furthermore, the interference fit and the snap-fit interlock described in detail above and not repeated herein in the interest of brevity may accomplish the securing of the oral care refill head 400 to the handle 300.

In the exemplified embodiment, when the oral care refill head 400 is coupled to the handle 300, the fifth and seventh reference planes RP5, RP7 are parallel to one another and oblique to each of the sixth and eight reference planes RP6, RP8, and the sixth and eighth reference plane RP6, RP8 are also oblique to one another.

The use of a specific numerical value as a prefix for the term "reference plane" is not necessarily consistent in the specification and the claims. Rather, the numerical values used in the specification are merely used to distinguish one reference plane from another. The same is done in the claims, although the prefixes for the reference planes in the claims are simply listed sequentially as they appear in the claims rather than listed in a way that corresponds with the way that same reference plane is described in the specification.

As used throughout, ranges are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

The invention claimed is:

1. An oral care refill head for detachable coupling to a stem of a handle, the oral care refill head comprising:
   an oral care treatment portion; and
   a sleeve portion comprising:
      a sleeve cavity extending along a cavity axis from a proximal edge surface of the sleeve portion to an end wall, the sleeve cavity comprising:
         a sleeve base section and
         a sleeve guide section and
         a sleeve interference section configured to form an interference fit with a stem interference section of the stem, wherein
         the sleeve base section extends axially from the proximal edge surface of the sleeve portion to a proximal end of the sleeve guide section, and
         the sleeve guide section extends axially from a distal end of the sleeve base section to a proximal end of the sleeve interference section, and
         the sleeve interference section extending axially from a distal end of the sleeve guide section to the end wall of the sleeve cavity, wherein
         a transverse cross-sectional area of the sleeve guide section defines a continuous taper from the proximal end of the sleeve guide section to the distal end of the sleeve guide section; and
         a transverse cross-sectional area of the sleeve interference section defines a continuous taper from the proximal end of the sleeve interference section to the end wall;
      wherein the taper of the sleeve guide section defines a greater degree of taper than the taper of the sleeve interference section;

a sleeve snap element configured to snap-interlock with a stem snap element of the stem, the sleeve snap element comprising a sleeve ring that protrudes from an inner surface of the sleeve portion and extends circumferentially around the inner surface of the sleeve portion;

and the proximal edge surface defining an opening into the sleeve cavity, the proximal edge surface extending radially from an outer sleeve edge to an inner sleeve edge, the proximal edge surface inclined from the inner sleeve edge to the outer sleeve edge in one direction downwardly away from the oral care treatment portion with increasing distance from the cavity axis;

and a sleeve rotational alignment element that is configured to mate with a stem rotational alignment element of the stem to prevent relative rotation between the handle and the oral care refill head, the sleeve rotational alignment element comprising a sleeve groove in the inner surface of the sleeve portion that defines the sleeve cavity, the sleeve groove extending axially from an open groove end in the proximal edge surface of the sleeve portion to a closed groove end wall, the sleeve rotational alignment element forming a part of the opening into the sleeve cavity at the proximal edge surface of the sleeve portion.

2. The oral care refill head according to claim 1 wherein the sleeve portion is configured to prevent the stem from being fully inserted into the sleeve cavity unless the stem rotational alignment element and the sleeve rotational alignment element are circumferentially aligned with one another.

3. The oral care refill head according to claim 1 wherein the sleeve rotational alignment element and the sleeve snap element are positioned on the sleeve portion so that a first reference plane that is transverse to the cavity axis intersects both the sleeve rotational alignment element and the sleeve snap element.

4. The oral care refill head according to claim 1 wherein the outer sleeve edge of the proximal edge surface lies in a reference plane that is oblique to the cavity axis.

5. The oral care refill head according to claim 1 wherein the oral care treatment portion comprises a plurality of tooth cleaning elements protruding from a head body, and wherein the head body is located at a distal end of the sleeve portion and extends along a head longitudinal axis that is inclined relative to the cavity axis; and wherein the head body is integrally formed with the sleeve portion as a monolithic component.

6. The oral care refill head according to claim 1 further comprising:
the oral care treatment portion coupled to a distal end of the sleeve portion, the oral care treatment portion comprising a front surface facing a first direction, a plurality of tooth cleaning elements protruding from the front surface;
the sleeve portion comprising a front surface facing the first direction and a rear surface facing a second direction, the second direction opposite the first direction;
a front portion of the outer sleeve edge of the proximal edge surface of the sleeve portion located a first axial distance from the distal end of the sleeve portion and a rear portion of the outer sleeve edge of the proximal edge surface of the sleeve portion located a second axial distance from the distal end of the sleeve portion, the second axial distance greater than the first axial distance.

7. The oral care refill head according to claim 6 wherein the front portion of the outer sleeve edge of the proximal edge surface of the sleeve portion is a high point of the proximal edge surface and the rear portion of the outer sleeve edge of the proximal edge surface of the sleeve portion is a low point of the proximal edge surface, when viewed in side profile.

8. The oral care refill head according to claim 6 wherein the plurality of tooth cleaning elements comprises a plurality of bristle tufts.

9. The oral care refill head according to claim 6 wherein the outer sleeve edge of the proximal edge surface lies in a reference plane that is oblique to the cavity axis.

10. The oral care refill head according to claim 6 wherein the oral care treatment portion comprises a head body comprising the front surface from which the plurality of teeth cleaning elements extend, the head body extending along a head longitudinal axis that is inclined relative to the cavity axis.

11. The oral care refill head according to claim 10 wherein the head longitudinal axis is inclined forward moving from a proximal end of the head body to a distal end of the head body.

12. The oral care refill head according to claim 1 wherein the proximal edge surface is inclined downwardly away from the oral care treatment portion with increasing distance from the cavity axis.

13. The oral care refill head according to claim 1 wherein the sleeve portion further comprises a continuous outer surface extending from the proximal edge surface to the oral care treatment portion, wherein the continuous outer surface does not comprise any openings, apertures, slits, or sleeve rotational alignment element.

14. The oral care refill head according to claim 1 wherein the sleeve base section, the sleeve guide section, and the sleeve interference section define an entirety of an interior volume of the sleeve cavity.

15. The oral care refill head according to claim 1 wherein the sleeve snap element and the sleeve rotational alignment element are located within the sleeve base section of the sleeve cavity.

16. The oral care refill head according to claim 1 wherein the transverse cross-sectional area of the sleeve guide section has a trapezoidal shape.

17. An oral care refill head for detachable coupling to a stem of a handle, the oral care refill head comprising:
an oral care treatment portion; and
a sleeve portion comprising:
a proximal edge surface;
a sleeve cavity extending along a cavity axis from the proximal edge surface to an end wall, the sleeve cavity comprising:
a sleeve base section, a sleeve guide section, and a sleeve interference section configured to form an interference fit with a stem interference section of the stem, wherein
the sleeve base section extends axially from the proximal edge surface of the sleeve portion to a proximal end of the sleeve guide section;
the sleeve guide section extends axially from a distal end of the sleeve base section to a proximal end of the sleeve interference section, and the sleeve interference section extending axially from a distal end of the sleeve guide section to the end wall of the sleeve cavity, wherein a transverse cross-sectional area of the sleeve guide section defines a uniform taper from the proximal end of the sleeve guide section to the distal end of the sleeve guide section; and a transverse cross-sectional area of the sleeve interference section defines a uniform taper from the proximal end of the sleeve interference section to the end wall; and wherein the taper of the sleeve guide section defines a greater degree of taper than the taper of the sleeve interference section.

18. The oral care refill head according to claim 17 wherein the sleeve portion comprises a sleeve rotational alignment element that is configured to mate with a stem rotational alignment element of the stem to prevent relative rotation between the handle and the oral care refill head, the sleeve rotational alignment element comprising a sleeve groove formed into an inner surface of the sleeve portion along the sleeve base section of the sleeve cavity, the sleeve groove extending axially from an open groove end in the proximal edge surface of the sleeve portion to a closed groove end wall.

19. The oral care refill head according to claim 18 further comprising a sleeve snap element comprising a sleeve ring that protrudes from the inner surface of the sleeve portion, the sleeve ring extending circumferentially around the inner surface of the sleeve portion and located within the sleeve base section of the sleeve cavity.

20. The oral care refill head according to claim 17 wherein the proximal edge surface defines an opening into the sleeve cavity, the proximal edge surface extending radially from an outer sleeve edge to an inner sleeve edge, the proximal edge surface inclined from the inner sleeve edge to the outer sleeve edge in one direction downwardly away from the oral care treatment portion with increasing distance from the cavity axis.

\* \* \* \* \*